US007890195B2

(12) United States Patent
Bergman et al.

(10) Patent No.: US 7,890,195 B2
(45) Date of Patent: Feb. 15, 2011

(54) CONTROLLER INTERFACE WITH MULTIPLE DAY PROGRAMMING

(75) Inventors: Gabriel A. Bergman, St. Louis Park, MN (US); Eugene J. Takach, Eden Prairie, MN (US); Marcus D. Stoner, Minnetonka, MN (US); John B. Amundson, Plymouth, MN (US); Philip O. Readio, Savage, MN (US); Paul G. Schwendinger, St. Louis Park, MN (US); Jeff D. Boll, Brooklyn Park, MN (US); Ian Thomson, Lanarkshire (GB); Colin T. Ferguson, Lanarkshire (GB); George J. Mcleod, Stirlingshire (GB); James A. Wolfbauer, Ramsey, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/700,656

(22) Filed: Feb. 4, 2010

(65) Prior Publication Data
US 2010/0145528 A1 Jun. 10, 2010

Related U.S. Application Data

(63) Continuation of application No. 11/532,355, filed on Sep. 15, 2006, now Pat. No. 7,693,582, which is a continuation of application No. 10/726,201, filed on Dec. 2, 2003, now Pat. No. 7,114,554.

(51) Int. Cl.
*G05B 11/01* (2006.01)
*G05B 15/00* (2006.01)
*G01M 1/38* (2006.01)
*G05B 13/00* (2006.01)
*G05D 23/00* (2006.01)
*G06F 3/00* (2006.01)

(52) U.S. Cl. ............... 700/17; 700/83; 700/275; 700/276; 700/277; 700/278; 715/700
(58) Field of Classification Search ............... 700/17, 700/83, 275–278; 715/700
See application file for complete search history.

(56) References Cited

U.S. PATENT DOCUMENTS 4,079,366 A 3/1978 Wong (Continued)

FOREIGN PATENT DOCUMENTS

DE 3334117.6 4/1985

(Continued)

OTHER PUBLICATIONS

All Non-Patent References Have Been Previously Provided in Parent U.S. Appl. No. 11/532,355, filed Sep. 15, 2006 and U.S. Appl. No. 10/726,201, filed Dec. 2, 2003.

(Continued)

*Primary Examiner*—Ronald D Hartman, Jr.
(74) *Attorney, Agent, or Firm*—Seager Tufte & Wickhem LLC

(57) ABSTRACT

A controller equipped with a user interface having multiple-day programming capabilities, including methods of programming such devices, are disclosed. The user interface may include one or more menus or screens that can be used to program a schedule for one or more selected days during the week. An illustrative method of programming the controller may include the steps of entering a scheduling routine, selecting multiple days for schedule modification, changing the schedule parameters for one or more periods during the selected days, and then exiting the scheduling routine.

21 Claims, 33 Drawing Sheets

U.S. PATENT DOCUMENTS

| | | | |
|---|---|---|---|
| 4,174,807 A | 11/1979 | Smith et al. | |
| 4,206,872 A | 6/1980 | Levine | |
| 4,215,408 A | 7/1980 | Games et al. | |
| 4,224,615 A | 9/1980 | Penz | |
| 4,264,034 A | 4/1981 | Hyltin et al. | |
| 4,267,966 A | 5/1981 | Neel et al. | |
| 4,296,334 A | 10/1981 | Wong | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,382,544 A | 5/1983 | Stewart | |
| 4,386,649 A | 6/1983 | Hines et al. | |
| 4,388,692 A | 6/1983 | Jones et al. | |
| 4,431,134 A | 2/1984 | Hendricks et al. | |
| 4,442,972 A | 4/1984 | Sahay et al. | |
| 4,446,913 A | 5/1984 | Krocker | |
| 4,479,604 A | 10/1984 | Didner | |
| 4,506,827 A | 3/1985 | Jamieson et al. | |
| 4,606,401 A | 8/1986 | Levine et al. | |
| 4,621,336 A | 11/1986 | Brown | |
| 4,622,544 A | 11/1986 | Bially et al. | |
| 4,717,333 A | 1/1988 | Carignan | |
| 4,725,001 A | 2/1988 | Carney et al. | |
| 4,730,941 A | 3/1988 | Levine et al. | |
| 4,783,800 A | 11/1988 | Levine | |
| 4,819,714 A | 4/1989 | Otsuka et al. | |
| 4,837,731 A | 6/1989 | Levine et al. | |
| 4,881,686 A | 11/1989 | Mehta | |
| 4,918,439 A | 4/1990 | Wozniak et al. | |
| 4,948,040 A | 8/1990 | Kobayashi et al. | |
| 4,992,779 A | 2/1991 | Sugino et al. | |
| 4,997,029 A | 3/1991 | Otsuka et al. | |
| 5,012,973 A | 5/1991 | Dick et al. | |
| 5,038,851 A | 8/1991 | Mehta | |
| 5,053,752 A | 10/1991 | Epstein et al. | |
| 5,065,813 A | 11/1991 | Berkeley et al. | |
| 5,086,385 A | 2/1992 | Launey et al. | |
| 5,088,645 A | 2/1992 | Bell | |
| 5,107,918 A | 4/1992 | McFarlane et al. | |
| 5,140,310 A | 8/1992 | DeLuca et al. | |
| 5,161,606 A | 11/1992 | Berkeley et al. | |
| 5,170,935 A | 12/1992 | Federspiel et al. | |
| 5,181,653 A | 1/1993 | Foster et al. | |
| 5,230,482 A | 7/1993 | Ratz et al. | |
| 5,238,184 A | 8/1993 | Adams | |
| 5,251,813 A | 10/1993 | Kniepkamp | |
| 5,259,445 A | 11/1993 | Pratt et al. | |
| 5,289,362 A | 2/1994 | Liebl et al. | |
| 5,329,991 A | 7/1994 | Mehta et al. | |
| 5,348,078 A | 9/1994 | Dushane et al. | |
| 5,386,577 A | 1/1995 | Zenda | |
| 5,412,377 A | 5/1995 | Evans et al. | |
| 5,461,558 A | 10/1995 | Patsiokas et al. | |
| 5,481,481 A | 1/1996 | Frey et al. | |
| 5,482,209 A | 1/1996 | Cochran et al. | |
| 5,526,422 A | 6/1996 | Keen | |
| 5,537,106 A | 7/1996 | Mitsuhashi | |
| 5,566,879 A | 10/1996 | Longtin | |
| 5,570,837 A | 11/1996 | Brown et al. | |
| 5,673,850 A | 10/1997 | Uptegraph | |
| 5,782,296 A | 7/1998 | Mehta | |
| 5,818,428 A | 10/1998 | Eisenbrandt et al. | |
| 5,873,519 A | 2/1999 | Beilfuss et al. | |
| 5,886,697 A | 3/1999 | Naughton et al. | |
| 5,901,183 A | 5/1999 | Garin et al. | |
| 5,902,183 A | 5/1999 | D'Souza | |
| 5,909,378 A | 6/1999 | De Milleville | |
| 5,937,942 A | 8/1999 | Bias et al. | |
| 5,947,372 A | 9/1999 | Tiernan | |
| 6,009,355 A | 12/1999 | Obradovich et al. | |
| 6,020,881 A | 2/2000 | Naughton et al. | |
| 6,032,867 A | 3/2000 | Dushane et al. | |
| 6,059,195 A | 5/2000 | Adams et al. | |
| 6,081,197 A | 6/2000 | Garrick et al. | |
| 6,116,512 A * | 9/2000 | Dushane et al. | 236/51 |
| 6,121,875 A | 9/2000 | Hamm et al. | |
| 6,140,987 A | 10/2000 | Stein et al. | |
| 6,144,971 A | 11/2000 | Sunderman et al. | |
| 6,192,282 B1 | 2/2001 | Smith et al. | |
| 6,196,467 B1 | 3/2001 | Dushane et al. | |
| 6,208,331 B1 | 3/2001 | Singh et al. | |
| 6,236,326 B1 | 5/2001 | Murphy | |
| 6,285,912 B1 | 9/2001 | Ellison et al. | |
| 6,290,140 B1 | 9/2001 | Pesko et al. | |
| 6,305,611 B1 | 10/2001 | Proffitt et al. | |
| 6,315,211 B1 | 11/2001 | Sartain et al. | |
| 6,318,639 B1 | 11/2001 | Toth | |
| 6,323,882 B1 | 11/2001 | Jerome et al. | |
| 6,330,806 B1 | 12/2001 | Beaverson et al. | |
| 6,344,861 B1 | 2/2002 | Naughton et al. | |
| 6,351,693 B1 | 2/2002 | Monie et al. | |
| 6,398,118 B1 | 6/2002 | Rosen et al. | |
| 6,478,233 B1 | 11/2002 | Shah | |
| 6,502,758 B2 | 1/2003 | Cottrell | |
| 6,518,957 B1 | 2/2003 | Lehtinen et al. | |
| 6,578,770 B1 | 6/2003 | Rosen | |
| 6,580,950 B1 | 6/2003 | Johnson et al. | |
| 6,581,846 B1 | 6/2003 | Rosen | |
| 6,595,430 B1 | 7/2003 | Shah | |
| 6,619,555 B2 | 9/2003 | Rosen | |
| 6,621,507 B1 | 9/2003 | Shah | |
| 6,628,997 B1 * | 9/2003 | Fox et al. | 700/86 |
| 6,658,303 B2 | 12/2003 | Hatemata et al. | |
| 6,685,098 B2 | 2/2004 | Okano et al. | |
| 6,687,678 B1 | 2/2004 | Vorimatsu et al. | |
| 6,718,213 B1 | 4/2004 | Enberg | |
| 6,782,706 B2 | 8/2004 | Holmes et al. | |
| 6,783,079 B2 | 8/2004 | Carey et al. | |
| 6,786,421 B2 | 9/2004 | Rosen | |
| 6,789,739 B2 | 9/2004 | Rosen | |
| 6,824,069 B2 | 11/2004 | Rosen | |
| 6,833,990 B2 | 12/2004 | LaCroix et al. | |
| 6,845,918 B2 | 1/2005 | Rotondo | |
| 6,851,621 B1 | 2/2005 | Wacker et al. | |
| 6,886,754 B2 | 5/2005 | Smith et al. | |
| 6,983,889 B2 * | 1/2006 | Alles | 236/49.1 |
| 6,997,390 B2 | 2/2006 | Alles | |
| 7,001,495 B2 | 2/2006 | Essalik et al. | |
| 7,028,912 B1 | 4/2006 | Rosen | |
| 7,050,026 B1 | 5/2006 | Rosen | |
| 7,089,066 B2 | 8/2006 | Hesse et al. | |
| 7,114,554 B2 | 10/2006 | Bergman et al. | |
| 7,130,719 B2 * | 10/2006 | Ehlers et al. | 700/276 |
| 7,142,948 B2 | 11/2006 | Metz | |
| 7,146,253 B2 | 12/2006 | Hoog et al. | |
| 7,152,802 B2 | 12/2006 | Kell et al. | |
| 7,156,318 B1 | 1/2007 | Rosen | |
| 7,302,642 B2 | 11/2007 | Smith et al. | |
| 7,306,165 B2 | 12/2007 | Shah | |
| 7,310,559 B2 | 12/2007 | Walko, Jr. | |
| 7,320,110 B2 | 1/2008 | Shah | |
| 7,556,207 B2 | 7/2009 | Mueller et al. | |
| 2001/0029585 A1 | 10/2001 | Simon et al. | |
| 2001/0052459 A1 | 12/2001 | Essalik et al. | |
| 2002/0092779 A1 | 7/2002 | Essalik et al. | |
| 2003/0034897 A1 | 2/2003 | Shamoon et al. | |
| 2003/0034898 A1 | 2/2003 | Shamoon et al. | |
| 2004/0260411 A1 * | 12/2004 | Cannon | 700/83 |
| 2004/0262410 A1 * | 12/2004 | Hull | 236/91 R |
| 2005/0108091 A1 | 5/2005 | Sotak et al. | |
| 2005/0116023 A1 | 6/2005 | Amundson et al. | |
| 2005/0119766 A1 | 6/2005 | Amundson et al. | |
| 2006/0004492 A1 | 1/2006 | Terlson et al. | |

2006/0192021 A1  8/2006  Schultz et al.

FOREIGN PATENT DOCUMENTS

| EP | 0070414 | 1/1983 |
|---|---|---|
| EP | 0678204 | 3/2000 |
| EP | 0985994 | 3/2000 |
| EP | 1033641 | 9/2000 |
| EP | 1074009 | 2/2001 |
| FR | 2711230 | 4/1995 |
| WO | 9711448 | 3/1997 |
| WO | 9739392 | 10/1997 |
| WO | 0152515 | 7/2001 |
| WO | 0179952 | 10/2001 |

OTHER PUBLICATIONS

"A Full Range of Alternative User Interfaces For Building Occupants and Operators," http://www.automatedbuildings.com/news/jan00/articles/andover/andover.htm, 5 pages, dated Jan. 2000, printed Sep. 20, 2004.

"CorAccess Systems/in Home," http://web.archive.org/web20011212084427/www.coraccess.com/home.html, 1 page, copyright 2001, printed Aug. 19, 2004.

"HAI Company Background," http://www.homeauto.com/AboutHAI/abouthai_main.htm, 2 pages, printed Aug. 19, 2004.

"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.

"Home Toys Review—TouchLinc", http://www.hometoys.com/htinews/aug99/reviews/touchlinc/touchlinc.htm, 3 pages, dated Aug. 1999, printed Aug. 20, 2004.

"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.

"Product Review—Philips Pronto Remote Control," http://hometheaterhifi.com/volume_6_2/philipsprontoremotecontrol.html, 5 pages, dated May 1999, printed Aug. 20, 2004.

"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.

"Spotlight on integrated systems," Custom Builder, V8, N2, p. 66(6), Mar.-Apr. 1993.

"Vantage Expands Controls for Audio/Video, HVAC and Security," http://www.hometoys.com/htinews/aug99/releases/vantage03.htm, 2 pages, dated Aug. 3, 1999, printed Aug. 20, 2004.

ADI, "Leopard User Manual," 93 pages, 2001.

Adicon 2500, "The Automator," 4 pages, Oct.-Dec. 2000.

ADT Security Services, "iCenter Advanced User Interface 8142ADT," Installation and Setup Guide, 5 pages, May 2001; First Sale Feb. 2001.

ADT Security Systems, "iCenter Advanced User Interface 8142ADT User Guide," pp. 1-136, 2001.

Aprilaire Electronic Thermostats Models 8344, 8346, 8348, 8363, 8365, 8366 Operating Instructions, 8 pages, 2003.

Aube Technologies, Electronic Thermostat for Heating System Model TH135-01, 5 pages, Aug. 14, 2001.

Aube Technologies, TH140-28 Electronic Programmable Thermostat, Installation Instructions and User Guide, pp. 1-4, Jan. 22, 2004.

AutomatedBuildings.com Article—"Thin Client" Solutions, "Pressure, Air Flow, Temperature, Humidity & Valves," Dwyer Instruments, Inc., 5 pages, printed Sep. 20, 2004.

Blake et al., "Seng 310 Final Project Demo Program" Illustration, 3 pages, Apr. 6, 2001.

Blake et al., "Seng 310 Final Project" Report, dated Apr. 6, 2001.

Braeburn Model 3000 Owner's Manual, pp. 1-13, 2001.

Braeburn Model 5000 Owners Manual, pp. 1-17, 2001.

BRK Electronics Maximum Protection Plus Ultimate Convenience Smoke Alarm, 24 pages, Sep. 2000.

BRK First Alert, User's Manual, Smoke and Fire Alarms, pp. 1-7, Nov. 2002.

Business Wire, "MicroTouch Specialty Products Group to Capitalize on Growing Market for Low-Cost Digital Matrix Touchscreens," p. 1174 (2 pages), Jan. 6, 1999.

Cardio Manual, available at http://www.secant.ca/En/Documentation/Cardio2é-Manual.pdf, Cardio Home Automation Inc., 55 pages, printed Sep. 28, 2004.

Cardio, by Secant; http://www.hometoys.com/htinews/apr98/reviews/cardio.htm, "HTINews Review," Feb. 1998, 5 pages, printed Sep. 14, 2004.

Carrier TSTATCCRF01 Programmable Digital Thermostat, pp. 1-21, prior to Apr. 21, 2005.

Carrier Microelectronic Programmable Thermostat Owner's Manual, pp. 1-24, May 1994.

Carrier, "Programmable Dual Fuel Thermostat," Installation, Start-Up & Operating Instructions, pp. 1-12, Oct. 1998.

Carrier, "Programmable Thermostats," Installation, Start-Up & Operating Instructions, pp. 1-16, Sep. 1998.

Carrier, "Standard Programmable Thermostat," Homeowner's Manual, pp. 1-8 pp. 1998.

Carrier, "Thermidistat Control," Installation, Start-Up, and Operating Instructions, pp. 1-12, Aug. 1999.

Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.

CorAccess, "Companion 6," User Guide, pp. 1-20, Jun. 17, 2002.

Danfoss RT51/51RF & RT52/52RF User Instructions, 2 pages, Jun. 2004.

DeKoven et al., "Designing Collaboration in Consumer Products," 2 pages, 2001.

DeKoven et al., "Measuring Task Models in Designing Intelligent Products," 2 pages, Jan. 13-16, 2002.

Domotique Secant Home Automation—Web Page, available at http://www.secant.ca/En/Company/Default.asp, 1 page, printed Sep. 28, 2004.

Firex Smoke Alarm, Ionization Models AD, ADC Photoelectric Model Pad, 4 pages, prior to Apr. 21, 2005.

Freudenthal et al., "Communicating extensive smart home functionality to users of all ages: the design of a mixed-initiative ative multimodal thermostat-interface," pp. 34-39, Mar. 12-13, 2001.

Gentex Corporation, HD135, 135° Fixed Temperature Heat Detector AC Pwered, 120V, 60Hz With Battery Backup, Installation Instructions—Owner's Information, pp. 1-5, Jun. 1, 1998.

Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.

Honeywell Brivis Deluxe Programmable Thermostat, pp. 1-20, 2002.

Honeywell Brivis T8602C Chronotherm IV Deluxe Programmable Thermostats, Installation Instructions, pp. 1-12, 2002.

Honeywell CT8602C Professional Fuel Server Thermostat, pp. 1-6, 1995.

Honeywell Electronic Programmable Thermostat, Owner's Guide, pp. 1-20, 2003.

Honeywell Electronic Programmable Thermostats, Installation Instructions, pp. 1-8, 2003.

Honeywell News Release, "Honeywell's New Sysnet Facilities Integration System For Boiler Plant and Combustion Safety Processes," 4 pages, Dec. 15, 1995.

"HTINews Review of Cardio by Secant," 5 pages, Printed From the Internet on Mar. 20, 2009, First appeared Feb. 1998.

Blister Pack Insert from a Ritetemp 8082 Touch Screen Thermostat Product, 2 pages, 2002.

Trouble Shooting Guide for Ritetemp Thermostat 8082, 1 page, 2002.

Quick Start Guide for Ritetemp Thermostat 8082, 1 page, 2002.

Install Guide for Ritetemp Thermostat 8082, 6 pages, 2002.

Remote Control Power Requirement for Ritetemp Thermostat 8082, 1 page, 2002.

Mounting Template for Ritetemp Thermostat 8082, 1 page, 2002.

White-Rodgers Installation Instructions for Heating & Air Conditioning IF78 5/2 Day Programmable Thermostat, 7 pages, prior to Jul. 7, 2004.

White-Rodgers, "Comfort-Set 90 Series Thermostat," Manual, pp. 1-24, prior to Jul. 7, 2004.
White-Rodgers Comfort-Set III Thermostat, pp. 1-44, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
White-Rodgers, Comfort-Set 90 Series Premium, 4 pages, prior to Apr. 21, 2005.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort SC3006 Single Stage Heat/Single Stage Cool or Single Stage Heat Pump/Manual Changeover, 1 page, prior to Jul. 7, 2004.
www.icmcontrols.com, Simplecomfort, SC3201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Lennox User's Manual, "Network Control Panel (NCP)," pp. 1-18, Nov. 1999.
Goolamabbas, "Computing Classes, Fall 1994, Georgia Tech," 53 pages, Nov. 4, 1994.
Honeywell T8002 Programmable Thermostat, Installation Instructions, pp. 1-8, 2002.
Honeywell T8602A,B,C,D and TS8602A,C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://www.cc.gatech.edu/computing/classes/cs6751_94_fall/groupc/climate-2/node1.html, "Contents," 53 pages, printed Sep. 20, 2004.
http://www.hometoys.com/htinews/apr99/releases/hal01.htm, HTI News Release, pp. 1-3, printed Oct. 28, 2004.
http://www.ritetemp.info/rtMenu_13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.

Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to July 7, 2004.
Invensys™, "9700i 9701i 9715i 9720i Deluxe Programmable Thermostats," User's Manual, pp. 1-28, prior to Jul. 7, 2004.
Lux TX9000 Installation, 3 pages, prior to Apr. 21, 2005.
Lux ELV1 Programmable Line Voltage Thermostat, Installation Instructions, 3 pages, prior to Jul. 7, 2004.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Lux TX500 Series Smart Temp Electronic Thermostat, 3 pages, prior to Jul. 7, 2004.
Metasys, "HVAC Pro for Windows User's Manual," 308 pages, 1998.
Proliphix, "Web Enabled IP Thermostats, Intelligent HVAC Control," Proliphix Inc., 2 pages, on or before Aug. 28, 2004.
Ritetemp Operation 8029, 3 pages, Jun. 19, 2002.
Ritetemp Operation 8050, 5 pages, Jun. 26, 2002.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Model P474-1035 Owner's Manual Programmable 5-2 Day Digital Thermostat, pp. 1-21, Apr. 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Apr. 21, 2005.
Totaline, "1 for All programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Instructions P/N P474-1010", Manual, 2 pages, Dec. 1998.
Totaline, "Programmable Thermostat", Homeowner's Guide, 27 pages, Dec. 1998.
Totaline, "Wireless Programmable Digital Thermostat," Owner's Manual 474-1100RF, 21 pages, 2000.
Visor Handheld User Guide, 280 pages, Copyright 1999-2000.
White-Rodgers 1F80-224 Programmable Electronic Digital Thermostat, Installation and Operation Instructions, 8 pages, prior to Apr. 21, 2005.
White-Rodgers Installation Instructions for Heating & Air Conditioning IF78 Non-Programmable Thermostat, 6 pages, prior to Apr. 21, 2005.
White-Rodgers, "Installation Instructions for Heating & Air Conditioning IF72 5/2 Day Programmable Heat Pump Thermostat," 8 pages, prior to Jul. 7, 2004.

* cited by examiner

|  | Monday | | Tuesday | | Wednesday | | ... | Saturday | | Sunday | |
|---|---|---|---|---|---|---|---|---|---|---|---|
| Wake | Heat Setpoint | 70 | Heat Setpoint | (70) | Heat Setpoint | (70) | | Heat Setpoint | 70 | Heat Setpoint | 70 |
| | Cool Setpoint | 75 | Cool Setpoint | 75 | Cool Setpoint | 75 | | Cool Setpoint | 75 | Cool Setpoint | 75 |
| Leave | Heat Setpoint | 65 | Heat Setpoint | (70) | Heat Setpoint | 65 | | Heat Setpoint | 70 | Heat Setpoint | 70 |
| | Cool Setpoint | 82 | Cool Setpoint | 75 | Cool Setpoint | 82 | | Cool Setpoint | 75 | Cool Setpoint | 75 |
| Return | Heat Setpoint | 70 | Heat Setpoint | (70) | Heat Setpoint | (70) | | Heat Setpoint | 70 | Heat Setpoint | 70 |
| | Cool Setpoint | 74 | Cool Setpoint | 75 | Cool Setpoint | 74 | | Cool Setpoint | 75 | Cool Setpoint | 75 |
| Sleep | Heat Setpoint | 68 | Heat Setpoint | 68 | Heat Setpoint | 68 | | Heat Setpoint | 68 | Heat Setpoint | 68 |
| | Cool Setpoint | 77 | Cool Setpoint | 77 | Cool Setpoint | 77 | | Cool Setpoint | 77 | Cool Setpoint | 77 |

— 180

— 182

CHANGE SETPOINT ACROSS SCHEDULE

CURRENT SETPOINT  [70] ◄► DEGREES

NEW SETPOINT  [72] ◄► DEGREES

WHICH DAYS?  M ☐  TU ☒  W ☒  TH ☒  F ☒  S ☐  SU ☐

184 — CURRENT SETPOINT
186 — NEW SETPOINT
190

*Figure 8*

CONTROLLER INTERFACE WITH MULTIPLE DAY PROGRAMMING

PRIORITY STATEMENT

This is a continuation of co-pending U.S. patent application Ser. No. 11/532,355, filed Sep. 15, 2006, entitled "CONTROLLER INTERFACE WITH MULTIPLE DAY PROGRAMMING", which is a continuation of U.S. patent application Ser. No. 10/726,201, filed Dec. 2, 2003, entitled "CONTROLLER INTERFACE WITH MULTIPLE DAY PROGRAMMING", now U.S. Pat. No. 7,114,554.

FIELD OF THE INVENTION

The present invention relates generally to the field of programmable controllers for homes and/or buildings are their related grounds. More specifically, the present invention relates to simplified interfaces for such controllers having multiple-day programming capabilities.

BACKGROUND OF THE INVENTION

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

In a typical HVAC application, for example, such controllers can be employed to monitor and, if necessary, control various environmental conditions occurring within a home or office building. The controller may include a microprocessor that interacts with other components in the system to regulate the temperature, humidity, venting, and/or air quality occurring at one or more locations. An internal sensor located within the controller and/or one or more remote sensors may be employed to sense when the temperature and/or humidity level reaches a certain threshold level, causing the controller to send a signal to activate or deactivate one or more components in the system.

The controller may be equipped with a user interface that allows the user to monitor and adjust various parameters of the controller. With more modern designs, the user interface typically comprises a liquid crystal display (LCD) or light emitting diode (LED) display inset within a controller housing that contains a microprocessor or the like, an I/O interface, and other components of the controller. The user interface may include a menu-driven interface that allows the user to scroll through one or more menus or screens to adjust the different settings on the controller. In some cases, a program within the controller prompts the user at each menu or screen to input various commands into the interface to adjust the controller settings.

In certain designs, the user interface can be configured to permit the user to program the controller to run on a certain schedule. For example, the controller can include a scheduling routine that allows the user to adjust the heat and cool points for one or more periods during a particular day in order to conserve energy. Once the parameters for that day have been programmed, the user can then repeat the process to change the settings for the other remaining days. With some designs, the controller may include a feature that allows the user to program a separate schedule for weekday and weekend use, or to copy settings for a particular day and apply those settings towards other days of the week.

Interaction with the user interface can often prove difficult, discouraging many users from attempting to program the controller to run on a schedule. While some modern controllers allow the user to copy settings from one day to another, the number of steps typically required to program the controller are often deemed too complex or time consuming. In some cases, the user interface may not allow the user to select multiple days outside of the normal weekday/weekend scheme. Accordingly, there is an ongoing need in the art to decrease the time and complexity associated with programming a controller to run a multiple-day schedule.

SUMMARY OF THE INVENTION

The present invention pertains to simplified interfaces for controllers having multiple-day programming capabilities. In one illustrative embodiment, a method of programming a multiple-day schedule in a controller equipped with a user interface can include the steps of entering a scheduling routine, selecting multiple days for schedule modification, changing the schedule parameters for one or more periods during the selected days, and then exiting the scheduling routine. The user may select or de-select days of the week to be modified at any point within the scheduling routine, including at certain pre-selected times. In some embodiments, the controller can be programmed to run the schedule for any day or combination of days, as desired by the user.

The controller may include a user interface that can be used for both displaying and modifying various parameters within the controller. For example, the user interface can include a touch screen, display panel/keypad, or any other suitable device adapted to transmit various commands to and from the controller. A number of mechanical and/or soft buttons (e.g. variable function, software configured) may be configured to accept input commands from the user. In certain embodiments, the user interface can include a menu-driven interface that allows the user to navigate through one or more menus or screens to modify various operational settings within the controller. The menu-driven interface may include a number of icons (e.g. descriptive buttons) prompting the user to input various commands with, for example, the touch screen or keypad. Using the interface, the user can program the controller to run a particular schedule for one or more days without having to copy the settings from one particular day and then apply those settings to other days of the week.

BRIEF DESCRIPTION OF THE DRAWINGS

FIG. 8 is a schematic view showing an illustrative embodiment for changing set points across a schedule;

DETAILED DESCRIPTION OF THE INVENTION

The following description should be read with reference to the drawings, in which like elements in different drawings are numbered in like fashion. The drawings, which are not necessarily to scale, depict illustrative embodiments and are not intended to limit the scope of the invention. Although examples of various programming and operational steps are illustrated in the various views, those skilled in the art will recognize that many of the examples provided have suitable alternatives that can be utilized. While the various devices, systems and methods illustrated herein are described specifically with respect to HVAC controllers, it should be understood that the present invention can be employed in other applications where multiple-day schedules are implemented, including, for example, water heater systems, water softener systems, security systems, lighting systems, sprinkler or drip water systems, audio/video (A/V) systems, etc.

Figure 1:
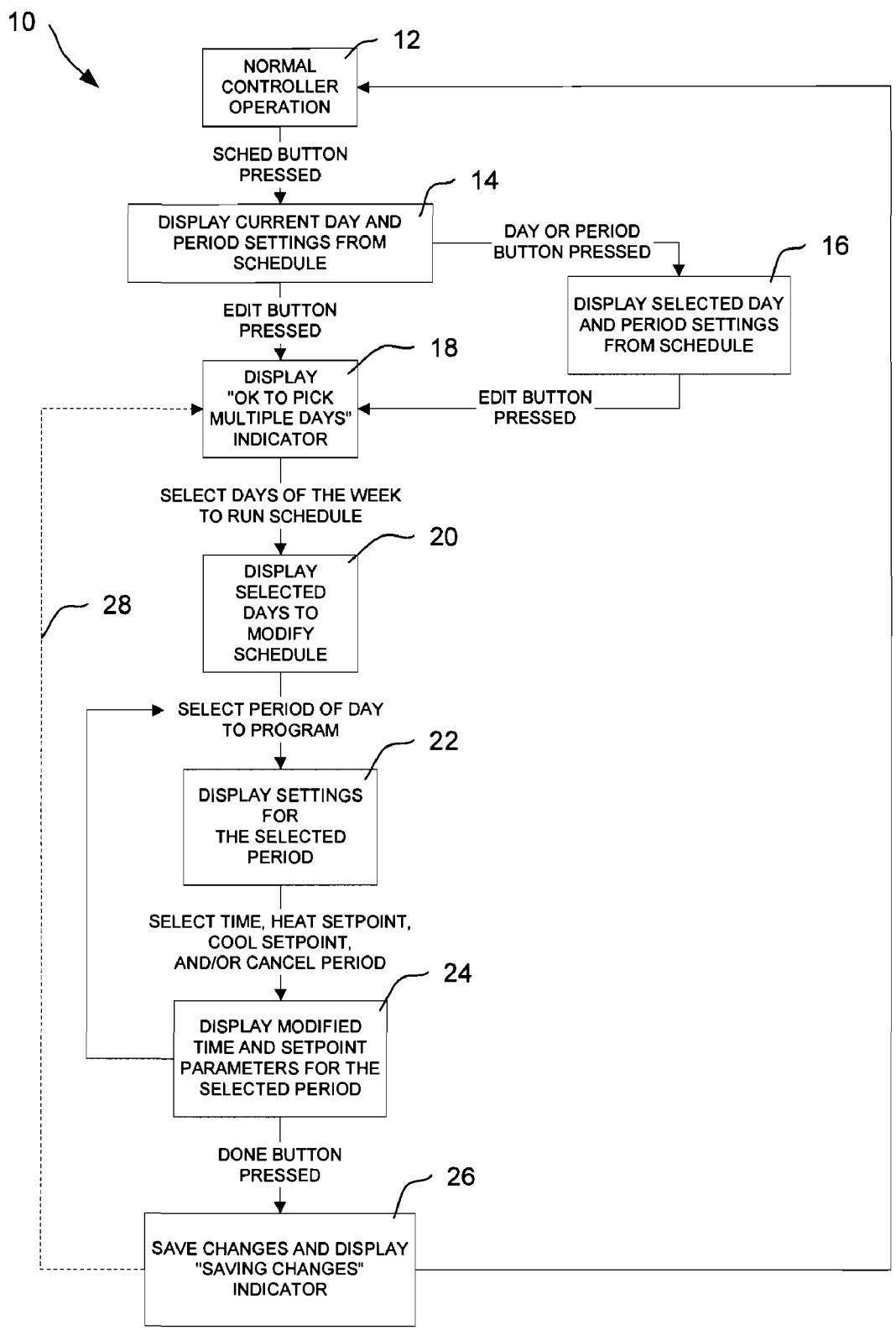
FIG. 1 is a flow chart of an illustrative method for programming a multiple-day schedule on a controller equipped with a user interface.

Referring now to FIG. 1, a flow chart showing an illustrative method of programming a multiple-day schedule on a controller equipped with a user interface is shown. The programming method, indicated generally by reference number 10, can begin with the step of initializing a scheduling routine within the controller that allows the user to view and, if desired, modify various parameters within a schedule. In an illustrative HVAC system for use in a home, for example, the controller can be configured to initialize a scheduling routine that allows the user to view and modify one or more periods during the day corresponding with the times during the day that the user wakes, leaves home, returns home, and sleeps. For example, the controller may include a separate "wake" period, "leave" period, "return" period, and "sleep" period that can be programmed within the schedule to conserve energy while the user is away from home or asleep. The "wake" period, "leave" period, "return" period, and "sleep" period are only examples, and it is contemplated that any suitable schedule may be used, depending on the application.

Within each period, the controller can include various event time and set point parameters that can be utilized to regulate various environmental conditions within a particular space. In certain embodiments, for example, the controller may include a heat set point parameter and cool set point parameter that can be utilized to regulate the amount of heating and/or cooling occurring within the home. The controller may further include a fan mode parameter that can be set to operate the fan in a particular manner during each period. For example, the controller can be configured to operate the fan constantly during each selected period (i.e. an "On Mode"), or automatically as needed (i.e. an "Auto Mode") during each selected period. Other parameters such as the ventilation, humidity level, frost level, air quality, etc. may also be regulated via the controller, as desired. The particular parameter(s) regulated by the controller will, of course, vary depending on the type of system in which the device is employed.

From a normal controller operation mode indicated generally by block 12, the user may initialize a scheduling routine within the controller that allows the user to view the current schedule parameters stored in memory, and, if desired, modify one or more of the parameters to create a new schedule. To initialize the scheduling routine, the user may send a request to the controller via the user interface, causing the controller to initiate a schedule review mode that displays the current settings on the user interface. Initialization of the schedule review mode may occur, for example, when the user presses a button on a touch screen or keypad, speaks a command, or otherwise sends a signal to the controller.

When the schedule review mode is initiated, the controller can be configured to display the current day and period settings for the schedule on the user interface, as indicated generally by block 14. For example, if the current time and day is 7:00 AM on Wednesday, the controller can be configured to display the "wake" period parameters for Wednesday upon initiating the schedule review mode.

To view other selected days and/or periods within the current schedule, the user may select each day and/or period, causing the controller to display the parameters for the selected day and/or period on the user interface, as indicated generally by block 16. The user can select each day individually within the schedule review mode to view the schedule parameters for each period without modification. If, for example, the user is currently viewing the schedule parameters for Wednesday during the "wake" period, the user can select other individual days of the week (e.g. Tuesday) to view the schedule parameters for that day's "wake" period. Within each individual day selected, the user can select each period to display the parameters scheduled to occur for that day. At any point during the schedule review mode, the user can send a signal to the controller to terminate the scheduling routine and return to the normal controller operation mode indicated by block 12.

In one illustrative embodiment, the user can modify one or more of the schedule parameters by initiating an editing mode within the controller. The user can initiate the editing mode by, for example, pressing an "edit" button on a touch screen, keypad or other input device, sending a signal to the controller to initiate the editing mode.

Upon initiation of the editing mode, the user interface can be configured to display a message that prompts the user to select the day or days that are to be modified in the schedule. As indicated by block 18, for example, the controller can be configured to display the message "OK TO PICK MULTIPLE DAYS" or other similar text or graphic on the user interface, prompting the user to select those days in the schedule to modify. The user can then select each day that is to be modified within the schedule, as desired.

As the first day is selected, the various periods in the schedule are then displayed on the user interface, as indicated generally by block 20. At this step, the user may select one or more days during the week to modify the schedule. For example, the user may select to run the schedule on alternating days of the week, during only the weekdays or weekends, or any other desired combination. The controller can be configured to notify the user of each day or combination of days selected using, for example, a check mark, blinking text, and/or other suitable indicator on the user interface.

The controller can be configured to default to one of the periods upon selecting the first day, displaying the schedule parameters for that particular day and period on the user interface. For example, if the user selects Monday as the first day to modify in the schedule, the controller can be configured to display the parameters for the "wake" period on the user interface. In certain embodiments, the controller can be configured to default to the period last modified in the schedule, or to the period following the last period modified in the schedule. In other embodiments, all periods for the selected day may be displayed.

Once the user has selected one or more days to be modified in the schedule, the controller can be configured to display the schedule parameters scheduled for each individual period, as indicated generally by block 22. The user can then modify one or more of the parameters for each selected period, as desired, causing the controller to display the new parameters on the user interface, as indicated generally by block 24.

To modify the schedule parameters for other periods, the user can select each desired period individually, and then repeat the process again until all desired periods have been modified in the schedule. In some cases, the user can select more than one period at once in order to simultaneously modify at least some of the parameters, such as the set points, at the selected periods and across the selected days. At any time during this process, the user may select or deselect one or more days of the week to include/exclude the modified parameters. For example, if the user decides after initially modifying the schedule parameters for one or more periods of selected days of the week, the user may select an additional day to include the modified schedule parameters. If desired, the user may choose to cancel the modified parameters by hitting a "cancel" button or other similar command on the user interface, causing the controller to terminate the schedule routine, discard the modified parameters, and return to the normal controller operation mode indicated by block 12.

The process of selecting the parameters for each period can be easily applied to one or more selected days during the week without having to first copy settings from one particular day, and then apply those settings to other selected days. For example, if the user has previously selected only Monday and Wednesday, but later decides to add Friday to the schedule, the user can send a signal to the controller to select Friday at any step during the editing routine to apply the modified schedule parameters for Friday. Since days can be easily selected or de-selected via the user interface, the user is not required to copy the settings for a particular day, and then apply those settings for the other days. Moreover, since the user can select any day or combination of days via the user interface, greater flexibility is provided to create a customized schedule.

After the user has finished modifying the schedule, the user can send a signal to the controller to either save or discard the modified settings. As indicated generally by block 26, the controller can be configured to display the text "Saving Changes" or other similar message on the user interface to notify the user that the controller has saved the modified schedule parameters. Once the modified schedule parameters have been either saved or cancelled, the controller can be configured to terminate the scheduling routine and revert to the normal controller operation mode indicated by block 12. Alternatively, and as shown by dashed line 28, the controller may revert back to, for example, block 18 to allow the user to select another day or set of days, as desired. Once saved, the controller can be configured to automatically run the modified schedule.

Figure 2:
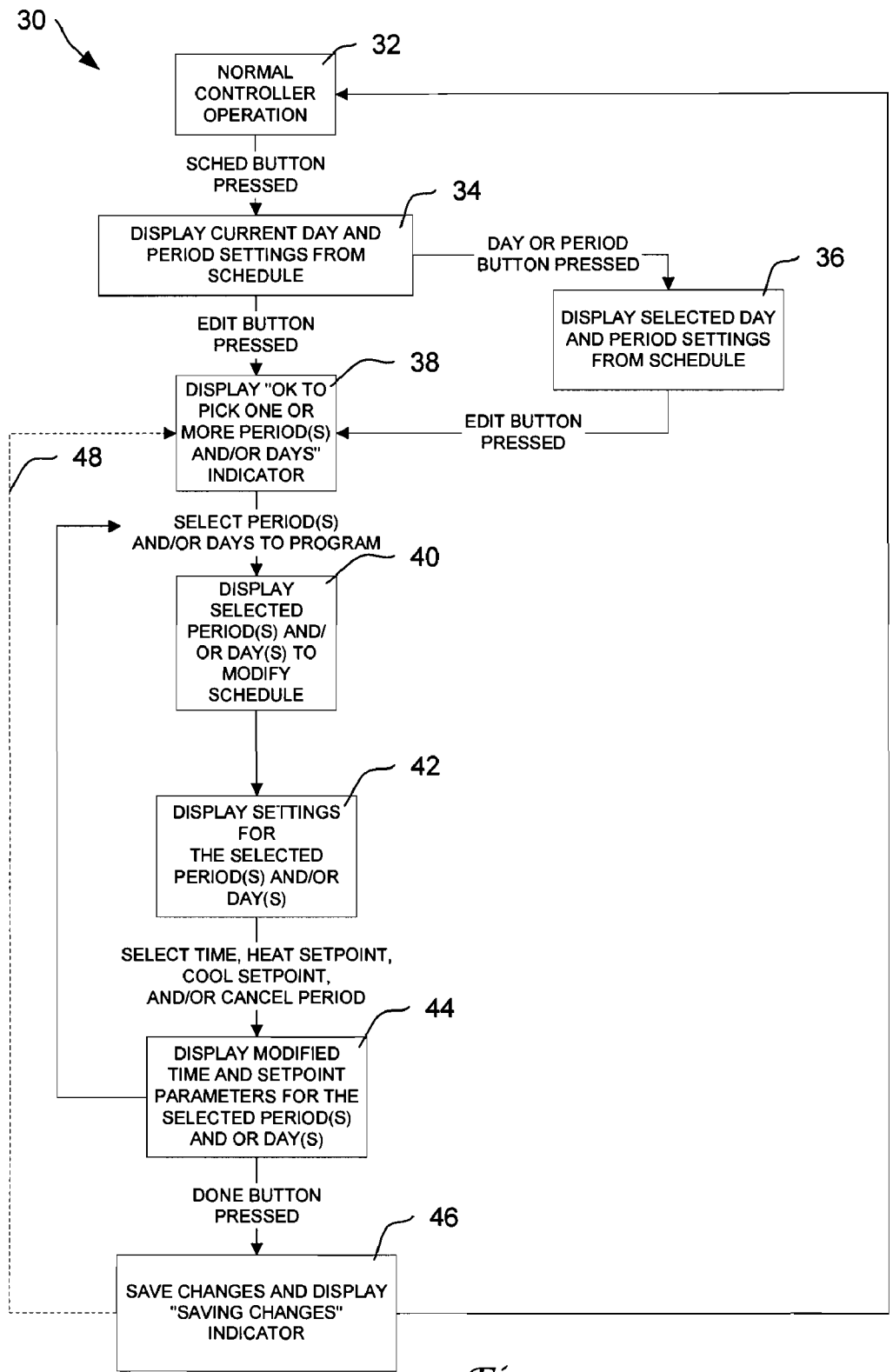
FIG. 2 is a flow chart of another illustrative method for programming a multiple-day schedule on a controller equipped with a user interface.

FIG. 2 is flow chart of another illustrative method for programming a multiple-day schedule on a controller equipped with a user interface. The programming method, indicated generally by reference number 30, can begin with the step of initializing a scheduling routine within the controller that allows the user to view and, if desired, modify various parameters within the schedule. As with the illustrative embodiment of FIG. 1, the user may initialize the scheduling routine from a normal operation mode 32, causing the controller to display the current day and period settings for the schedule on the user interface, as indicated generally by block 34. To view other selected days and/or period(s) within the current schedule, the user may select each day and/or period on the user interface, causing the controller to display the parameters for the selected day and/or period on the user interface, as indicated generally by block 36.

In one illustrative embodiment, the user can modify one or more of the schedule parameters by initiating an editing mode within the controller. The user can initiate the editing mode by, for example, pressing an "edit" button on a touch screen, keypad or other input device, sending a signal to the controller to initiate the editing mode.

Upon initiation of the editing mode, the user interface can be configured to display a message that prompts the user to select one or more days and/or one or more periods that can be modified in the schedule. As indicated by block 38, for example, the controller can be configured to display the message "OK TO PICK ONE OR MORE PERIODS AND/OR DAYS" or other similar text or graphic on the user interface, prompting the user to user to select one more days and/or periods to be modified within the schedule, as desired.

As the first period and/or day is selected, the various period(s) and/or day(s) to be modified are then displayed on the user interface, as indicated generally by block 40. At this step, the user may select any combination of days and/or periods to modify the schedule, as desired. For example, the user may select to run the schedule on multiple days for a certain period, for a single day with multiple periods, or for multiple days with multiple periods for each selected day. The controller can be configured to notify the user of each day and/or period selected using, for example, a check mark, blinking text, and/or other suitable indicator on the user interface.

Once the user has selected one or more periods and/or days to be modified in the schedule, the controller can be configured to display the schedule parameters scheduled for the selected period(s) and/or day(s), as indicated generally by block 42. The user can then modify one or more of the schedule parameters, as desired, causing the controller to display the new parameters on the user interface, as indicated generally by block 44. At any time during this process, the user may select or de-select one or more periods and/or days of the week to run the schedule without modifying the schedule parameters. If desired, the user may choose to cancel the modified parameters by hitting a "cancel" button or other similar command on the user interface, causing the controller to terminate the scheduling routine, discard the modified parameters, and return to the normal controller operation mode indicated by block 32.

Once the user has finished modifying the schedule, the user can send a signal to the controller to save the modified settings, as indicated generally by block 46. In certain embodiments, the controller can be configured to display the text "Saving Changes" or other similar message on the user interface to notify the user that the controller has saved the modified schedule parameters. Once the modified schedule parameters have been either saved or cancelled, the controller can be configured to terminate the scheduling routine and revert to the normal controller operation mode indicated by block 32. Alternatively, and as shown by dashed line 48, the controller may revert back to, for example, block 38 to allow the user to select one or more additional periods and/or days, as desired. Once saved, the controller can be configured to automatically run the modified schedule.

Figure 3:
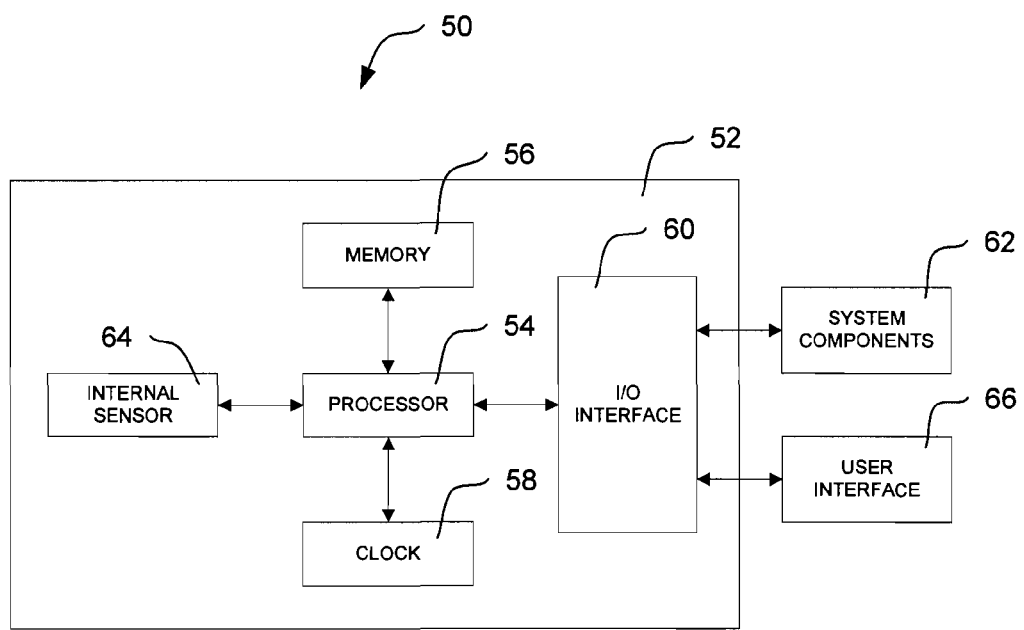
FIG. 3 is a block diagram of an illustrative HVAC system employing a controller having multiple-day programming capabilities.

FIG. 3 is a block diagram of an illustrative HVAC system 50 employing a controller 52 having multiple-day programming capabilities. The illustrative controller 52 includes a processor 54 (e.g. a microprocessor/CPU), a storage memory 56, a clock 58, and an I/O interface 60 that electrically connects the controller 52 to other system components 62. In an illustrative HVAC system for use in a home, the controller 52 can be electrically connected to an air conditioner unit, heater unit, ventilation unit, and/or a humidifier/dehumidifier unit that can be selectively activated or deactivated to regulate the temperature, humidity and air quality levels within the home. Other components such as a filtration unit, UV lamp, defroster, and flue damper can also be connected to the controller 52, as desired. An internal sensor 64 may be located within the controller 52, and can be employed to constantly measure the temperature and/or humidity levels occurring within the structure. In certain designs, the controller 52 can include one or more remote sensors (not shown) configured to measure the temperature and humidity levels outside of the home, or at locations apart from the controller 52.

The controller 52 can be equipped with a user interface 66 that can be used to transmit signals to and from the controller 52. The user interface 66 can include a touch screen, LCD panel and keypad, dot matrix display, computer (e.g. a PDA), or any other suitable device for sending and receiving signals to and from the controller 52. In certain embodiments, the user interface 66 may include a menu-driven interface that allows the user to cycle through one or more menus or screens to view and, if desired, modify various operational settings within the controller 52. For example, the controller 52 can be pre-programmed to run separate routines for adjusting the current temperature or humidity levels, changing the clock or date settings on the controller 52, setting a vacation mode on the controller 52 that can be run while the user is away, or checking the status of the various system components connected to the controller 52. The menus or screens corresponding to a particular routine can be organized from general to more specific, providing the user with only pertinent information at each step within the routine.

Figure 4:
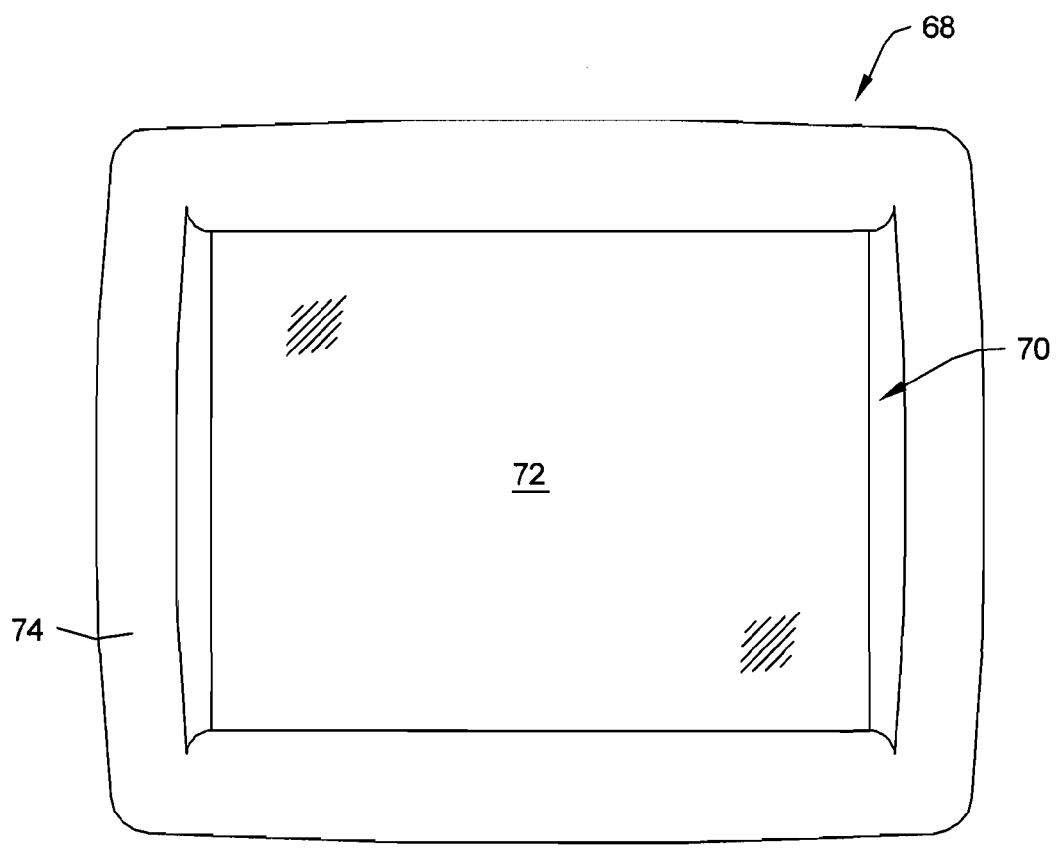
FIG. 4 is a plan view of an illustrative HVAC controller equipped with a touch screen interface.

FIG. 4 is a plan view illustrating an exemplary HVAC controller 68 equipped with a user interface 70 suitable for programming a multiple-day schedule. As shown in FIG. 4, the user interface 70 can include a touch screen 72 configured to display information and transmit signals to and from the controller 68. Some examples of suitable touch screens for use with the controller 68 may include resistive, capacitive, infrared or surface acoustic wave (SAW) type touch screens. While the touch screen 72 of FIG. 4 is shown inset or recessed within a controller housing 74, other configurations are possible. In some embodiments, the touch screen 72 may be provided as a separate element for use with a personal digital assistant (PDA), PC computer, or other remote device. In certain embodiments, the touch screen 72 can be provided as part of a liquid crystal display (LCD) panel, cathode ray tube (CRT), or other suitable display device.

FIGS. 5A-5J are pictorial views showing an illustrative method of programming a multiple-day schedule using the controller 68 and user interface 70 of FIG. 4. In a first view depicted in FIG. 5A, the controller 68 can be configured to display a main menu screen 76 on the touch screen 72, providing the user with basic information about the current operational status of the controller 68. The main menu screen 76 may be the default screen that appears on the touch screen 72 when the controller 68 is initially activated, after a loss of power has occurred, or after no activity has been detected by the user interface 70 for a certain period of time (e.g. after 1 minute of non-activity).

In the illustrative embodiment, the controller 68 is configured to display a current inside temperature parameter 78 (in either ° F. or ° C.), a current outside temperature parameter 80 (in either ° F. or ° C.), a time of day parameter 82, and a day of week parameter 84 on the touch screen 72. The current heat/cool set point parameter 86 may also be displayed on the touch screen 72, indicating the temperature at which the controller 68 is currently set to maintain. An alphanumeric message 88 displayed on the touch screen 72 may be provided to inform the user whether the controller 68 is currently following the schedule.

A set of up/down buttons 90 displayed on the touch screen 72 can be pressed, if desired, to temporarily change the current heat/cool set point parameter 86 to a setting different from that contained in the schedule. A fan mode button 92 and system mode button 94 displayed on the touch screen 72 allow the user to view and, if desired, modify the fan and system settings. For example, and in the illustrative embodiment, the fan mode button 92 can be pressed repeatedly to cycle the fan between an "On Mode", "Auto Mode", and other modes as desired, allowing the user to control the operation of the fan. In similar fashion, the system mode button 94 can be pressed repeatedly to cycle the controller 68 through various heating and cooling modes, as desired.

A "SCHED" button 96 located on the main menu screen 76 can used to initialize a scheduling routine within the controller 68 to modify one or more parameters within the current schedule. When the "SCHED" button 96 is pressed, the controller 68 can be configured to initiate a schedule review mode, causing the controller 68 to access the current schedule parameters and display them on the touch screen 72. As shown in FIG. 5B, for example, the controller 68 can be configured to access the event time parameter 98, heat set point parameter 100, and cool set point parameter 102 for the current schedule, and then display these parameters as alphanumeric text on the touch screen 72.

In the illustrative embodiment, a series of buttons 104 located on the top of the touch screen 72 correspond to the days of the week, and can be pressed to send a signal to the controller 68 to display the schedule parameters for each individual day in the schedule. An icon, blinking text or other suitable indicator for informing the user the current day selected may be displayed on the touch screen 72. For example, in the pictorial view illustrated in FIG. 5B, an icon 106 (e.g. check mark) may be displayed on the touch screen 72, informing the user that the schedule parameters for Wednesday are currently being displayed.

The controller 68 can be configured to default to the current day of the week when the schedule review mode is initiated.

For example, if the current time and day is 7:00 AM on Wednesday, the controller 68 can be configured to display the "wake" period parameters for Wednesday on the touch screen 72. To view the schedule parameters for other days of the week, the user may press the appropriate day button 104 on the touch screen 72, causing the controller 68 to display the corresponding parameters for that selected day.

Within each selected day, the user may press one or more period buttons on the touch screen 72, causing the controller 68 to display the parameters scheduled for that day. The touch screen 72 may include, for example, a "WAKE" button 108, a "LEAVE" button 110, a "RETURN" button 112, and a "SLEEP" button 114 that correspond to a separate "wake" period, "leave" period, "return" period, and "sleep" period programmed in the controller 68. In the pictorial view depicted in FIG. 5B, for example, the "LEAVE" button 110 has been pressed (indicated generally by bolded text), causing the controller 68 to display the event time parameter 98 (i.e. 8:00 AM), heat set point parameter 100 (i.e. 62° F.) and cool set point parameter 102 (i.e. 85° F.) corresponding to the "leave" period.

While four periods are specifically illustrated in FIG. 5, it should be understood that the controller 68 could be programmed for a greater or lesser number of periods, if desired. The number of periods will, of course, vary depending on the particular application in which the controller 68 is employed.

Figure 5A:
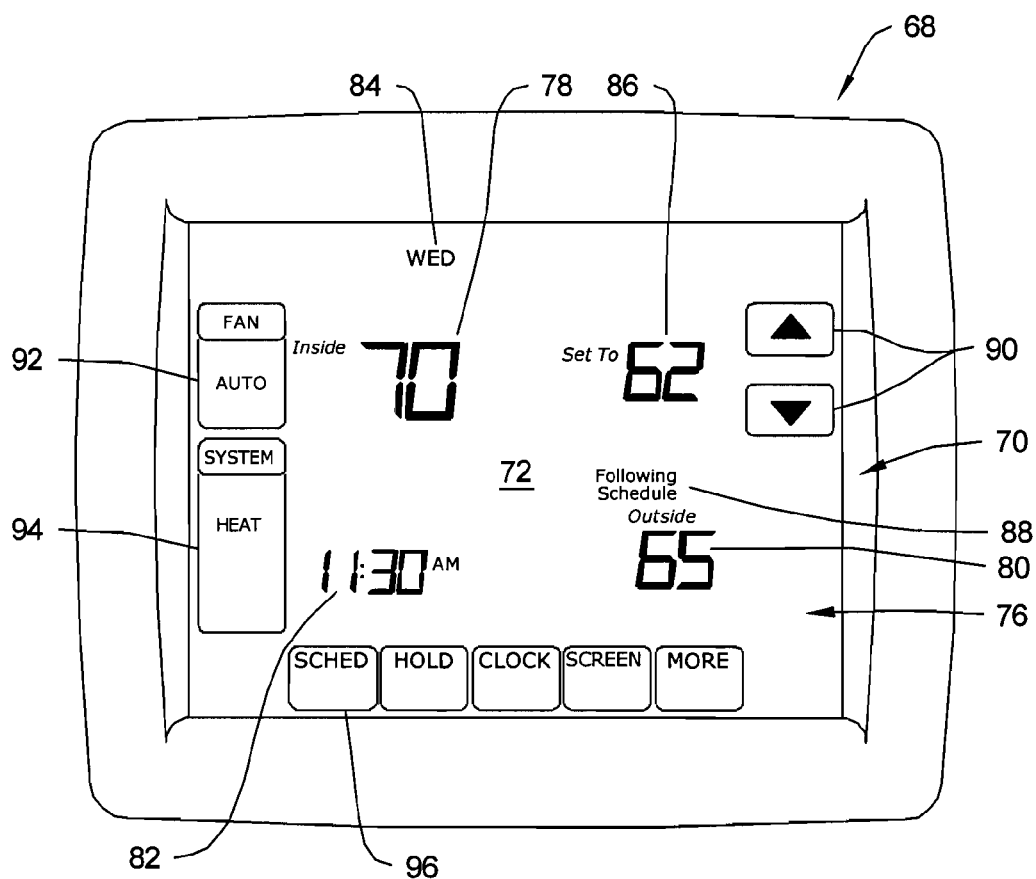
FIGS. 5A-5J are pictorial views showing an illustrative method of programming a multiple-day schedule using the touch screen interface of FIG. 4.
Figure 5B:
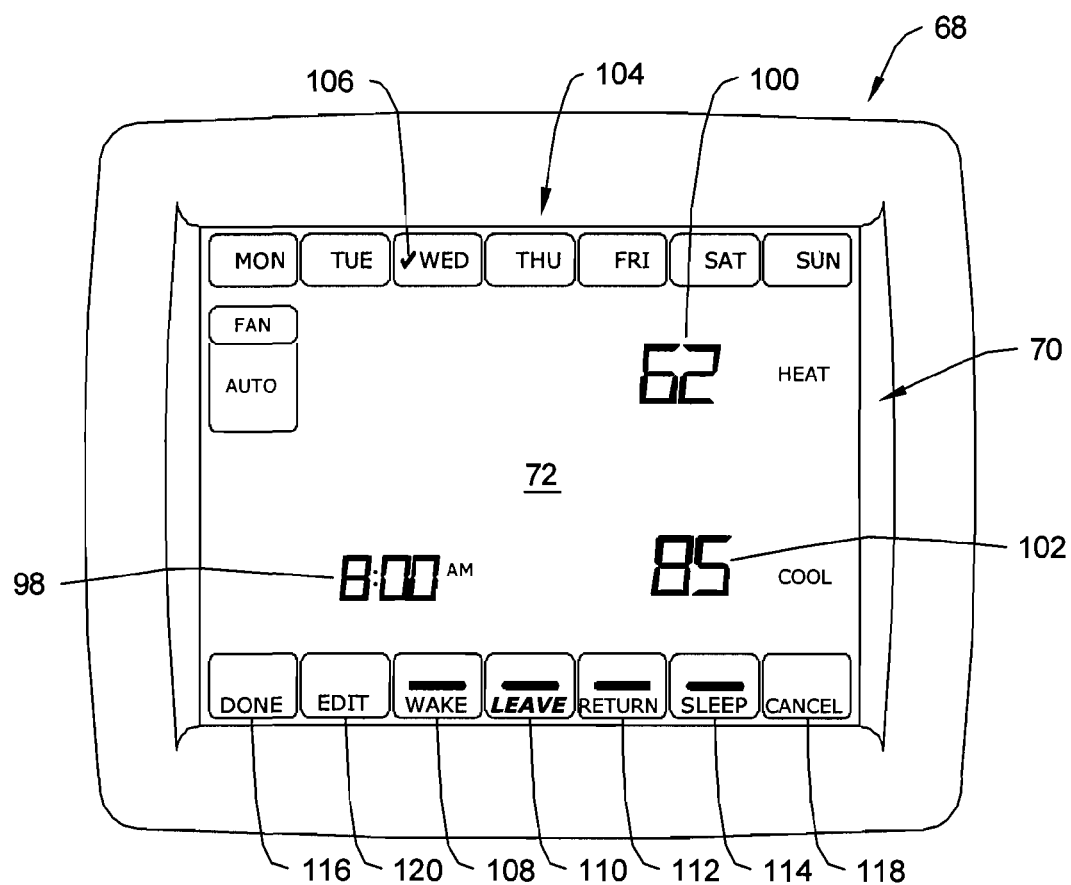

Once the user has finished viewing the desired schedule parameters for each day and/or period, the user can terminate the schedule review mode by pressing a "DONE" button 116 or "CANCEL" button 118 displayed on the touch screen 72, causing the controller 68 to terminate the scheduling routine and return to the main menu screen 76 of FIG. 5A.

Figure 5C:
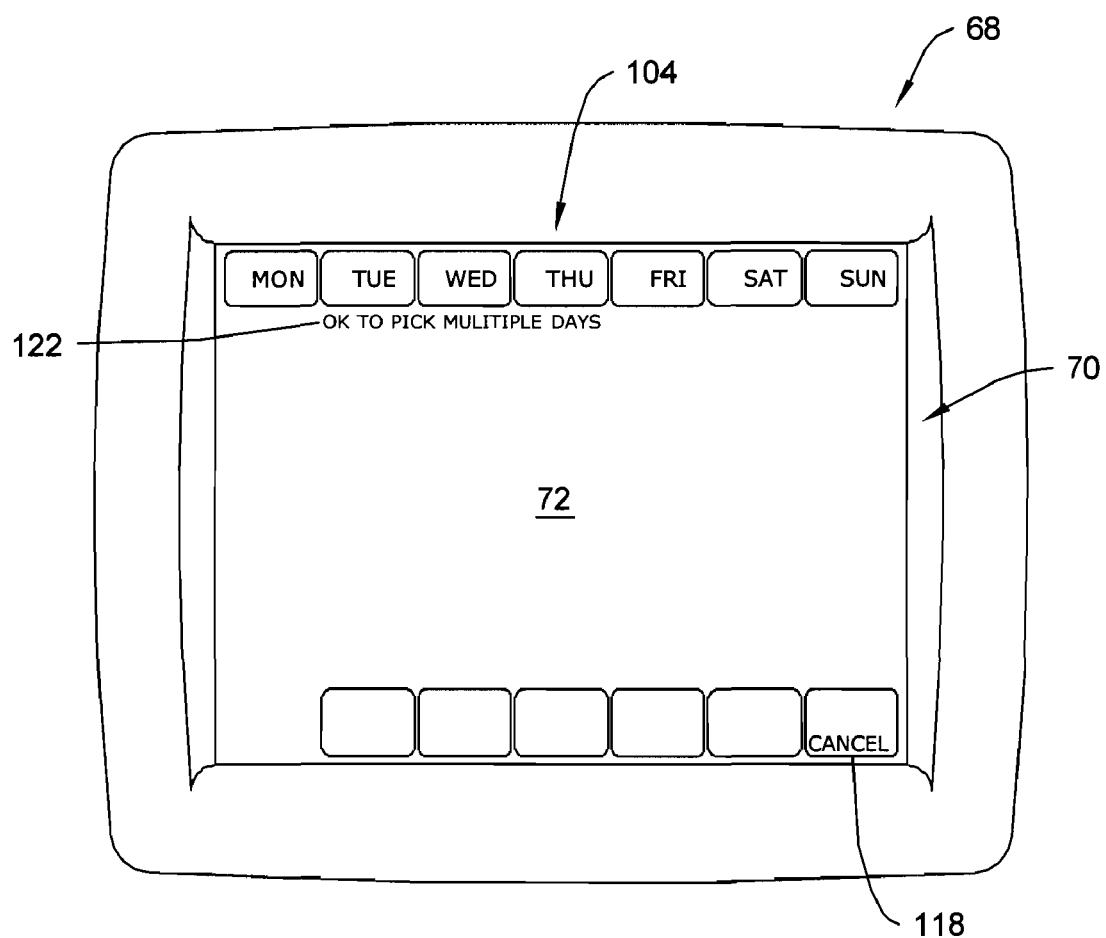

To modify one or more parameters in the schedule, the user can initiate an editing mode within the controller 68 by pressing an "EDIT" button 120 on the touch screen 72. As shown in FIG. 5C, for example, if the user presses the "EDIT" button 120, an alphanumeric message 122 stating, for example "OK TO PICK MULTIPLE DAYS" can appear on the touch screen 72, informing the user that multiple days can be selected. Other message variations may appear in addition to, or in lieu of, the alphanumeric message 122 illustrated in FIG. 5C. For example, the controller 68 can be configured to display the text "PLEASE SELECT AT LEAST ONE DAY TO MODIFY" or other similar message on the touch screen 72. The user can then either select one or more days to modify the schedule using the appropriate day button(s) 104, or press the "CANCEL" button 118 to terminate the scheduling routine and return to the main menu screen 76 of FIG. 5A.

Figure 5D:
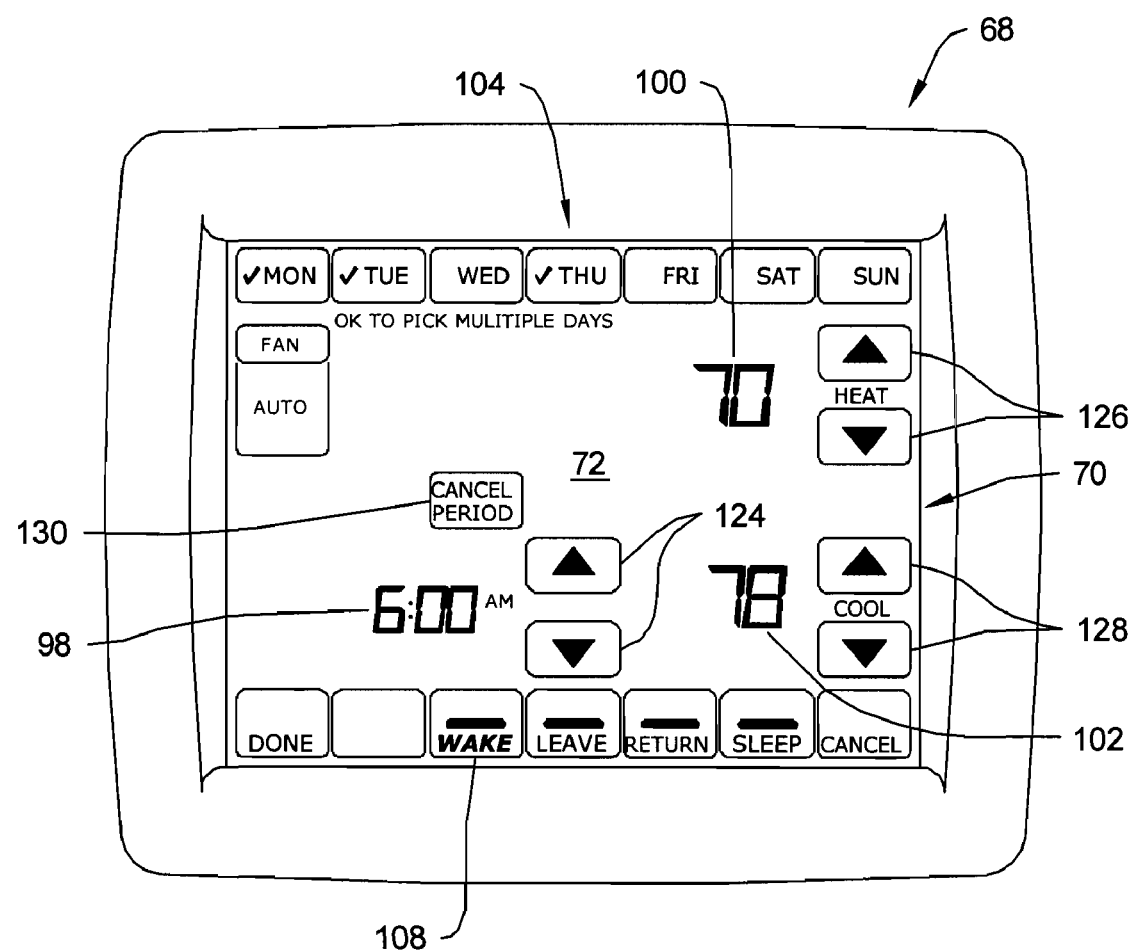

FIG. 5D is a pictorial view showing the selection of Monday, Tuesday, and Thursday using the "MON", "TUE" and "THU" buttons 104 on the touch screen 72. As shown in FIG. 5D, when at least one of the day buttons 104 is pressed, the controller 68 can be configured to display the currently programmed event time parameter 98, heat set point parameter 100, and a cool set point parameter 102 for one of the periods in the schedule. A set of up/down buttons 124 can be utilized to modify the event time parameter 98 within the schedule to an earlier or later time, as desired. A similar set of up/down buttons 126,128 can be utilized to adjust, respectively, the heat set point parameter 100 and cool set point parameter 102 to a higher or lower temperature level, as desired, for the selected period.

The controller 68 can be configured to indicate the particular period the user is viewing on the touch screen 72 using an icon, blinking text or other indicator means. In FIG. 5D, for example, the text for the "WAKE" button 108 can configured to blink on and off (indicated generally by bolded text) to indicate that the user is currently viewing the settings for the "wake" period.

Figure 5E:
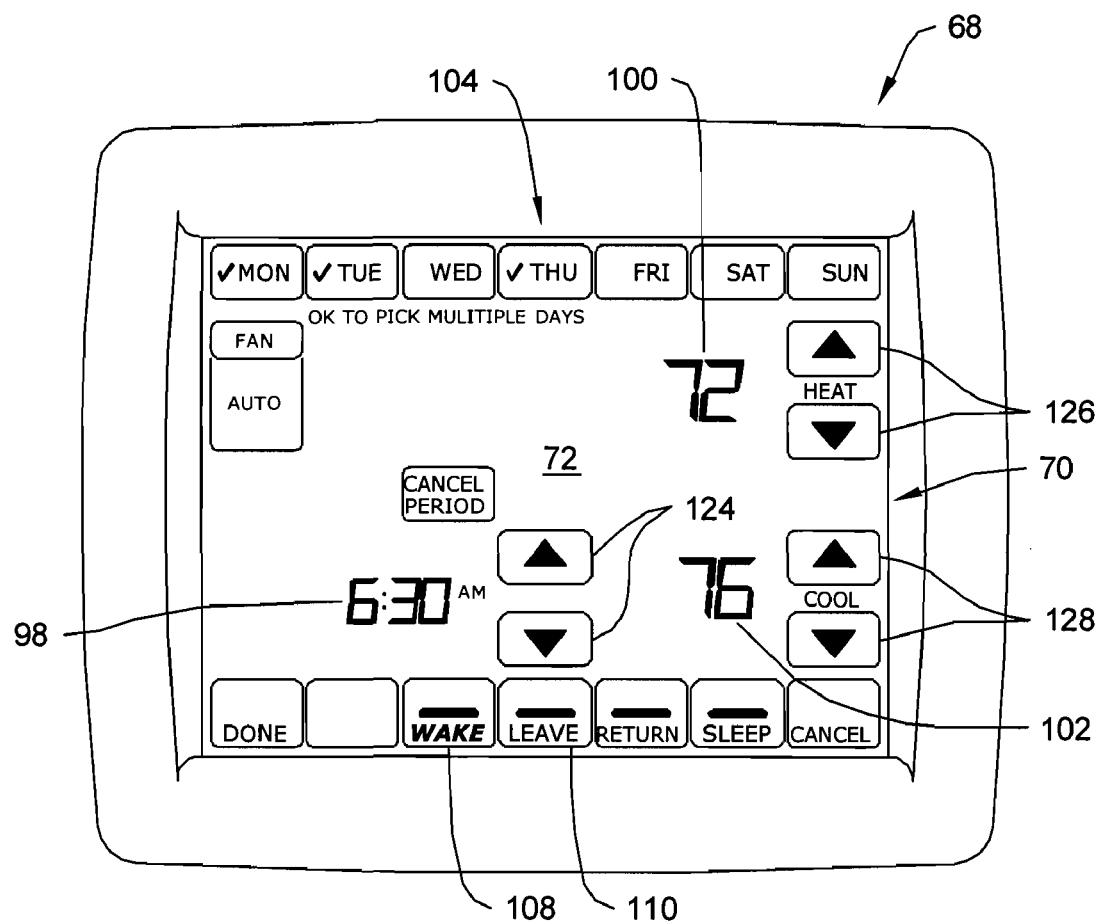

If the user desires to modify one or more of schedule parameters for the selected period, the user may use the appropriate set of up/down buttons 124,126,128 to modify the parameter. As shown in FIG. 5E, for example, the user can modify the event time parameter 98 from 6:00 AM to 6:30 AM using the set of up/down buttons 124 located adjacent to the event time parameter 98. In similar fashion, the user may use the appropriate set of up/down buttons 126,128 to adjust the heat set point parameter 100 from 70° F. to 72° F., and the cool set point parameter 102 from 78° F. to 76° F.

Figure 5F:
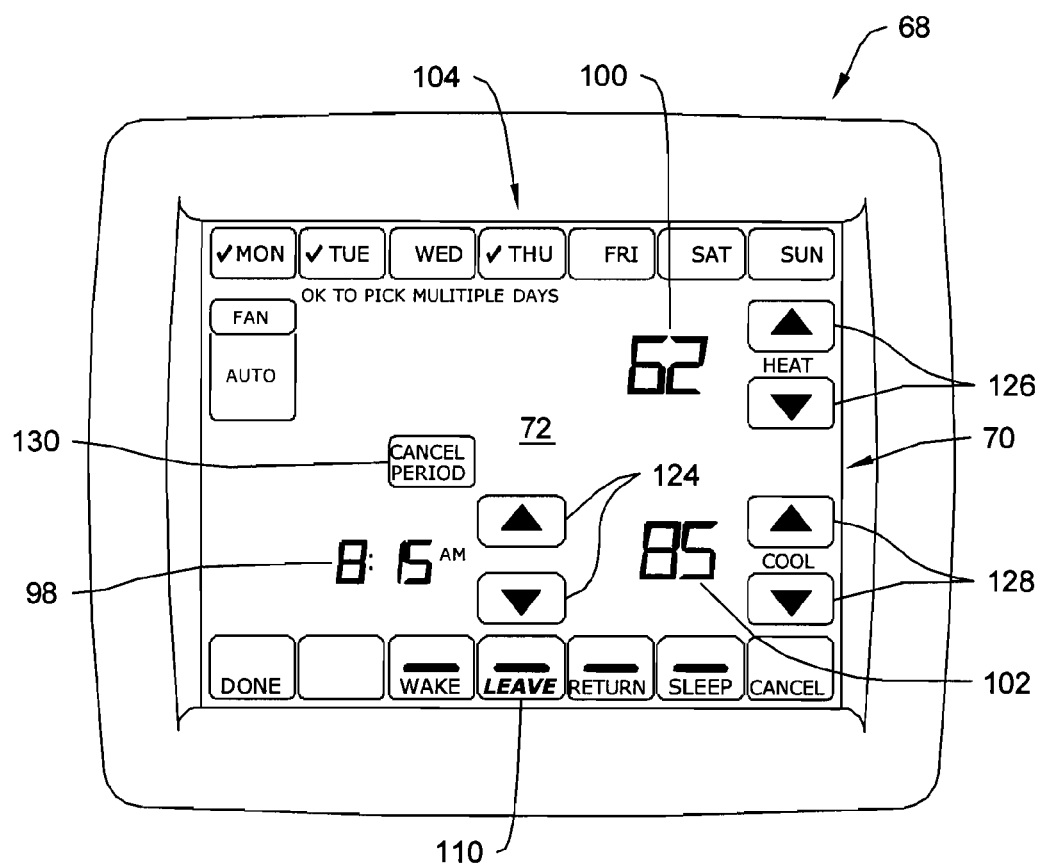

To display the parameters for the other periods, the user may press the appropriate period button on the bottom of the touch screen 72, causing the controller 68 to display the schedule parameters for that selected period. To display the settings for the "leave" period, for example, the user may press the "LEAVE" button 110 on the touch screen 72, causing the controller 68 to display the event time parameter 98, heat set point parameter 100, and cool set point parameter 102 for the "leave" period on the touch screen 72, as shown in FIG. 5F. Once selected, the appropriate set of up/down buttons 124,126,128 can be pressed to modify the scheduler parameters, as desired. As with the "WAKE" button 108 discussed above with respect to FIG. 5E, the "LEAVE" button 110 can include indicator means (e.g. blinking text) to indicate that that the user is currently viewing the settings for the "leave" period.

Figure 5G:
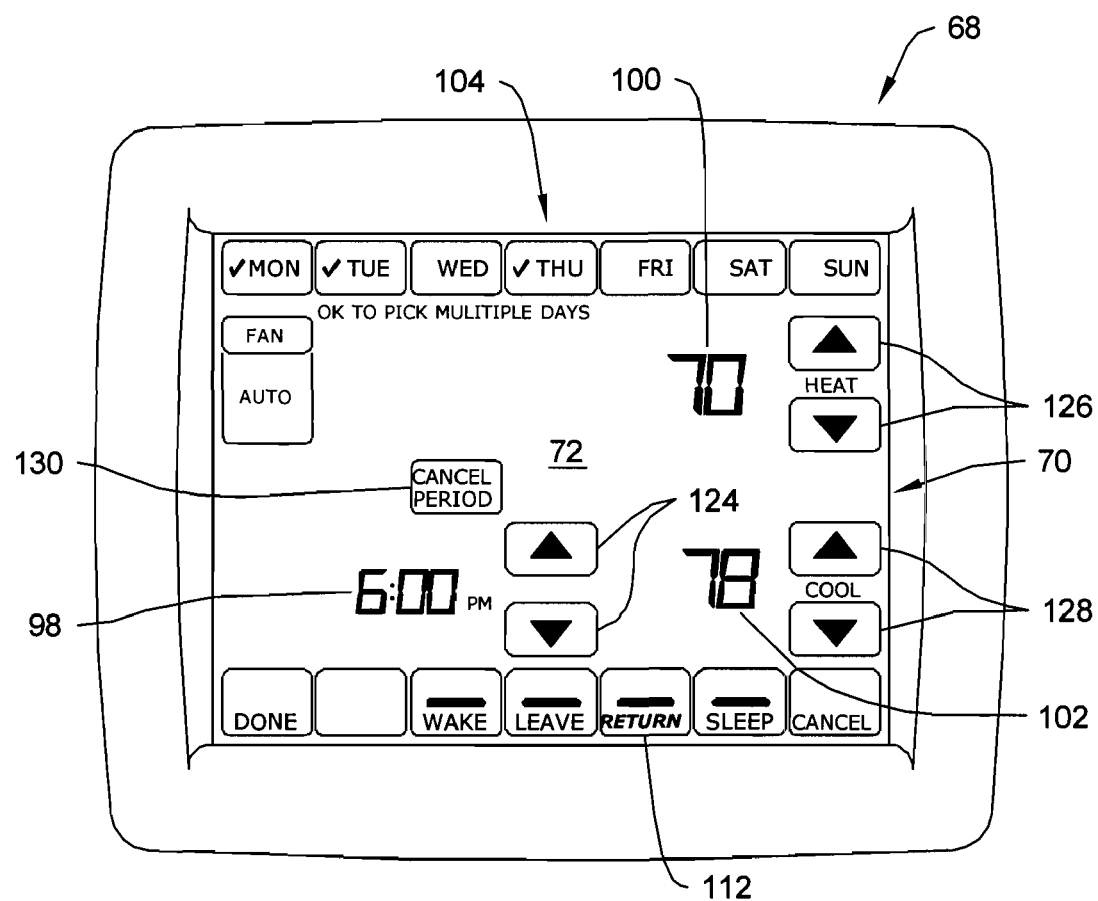
Figure 5H:
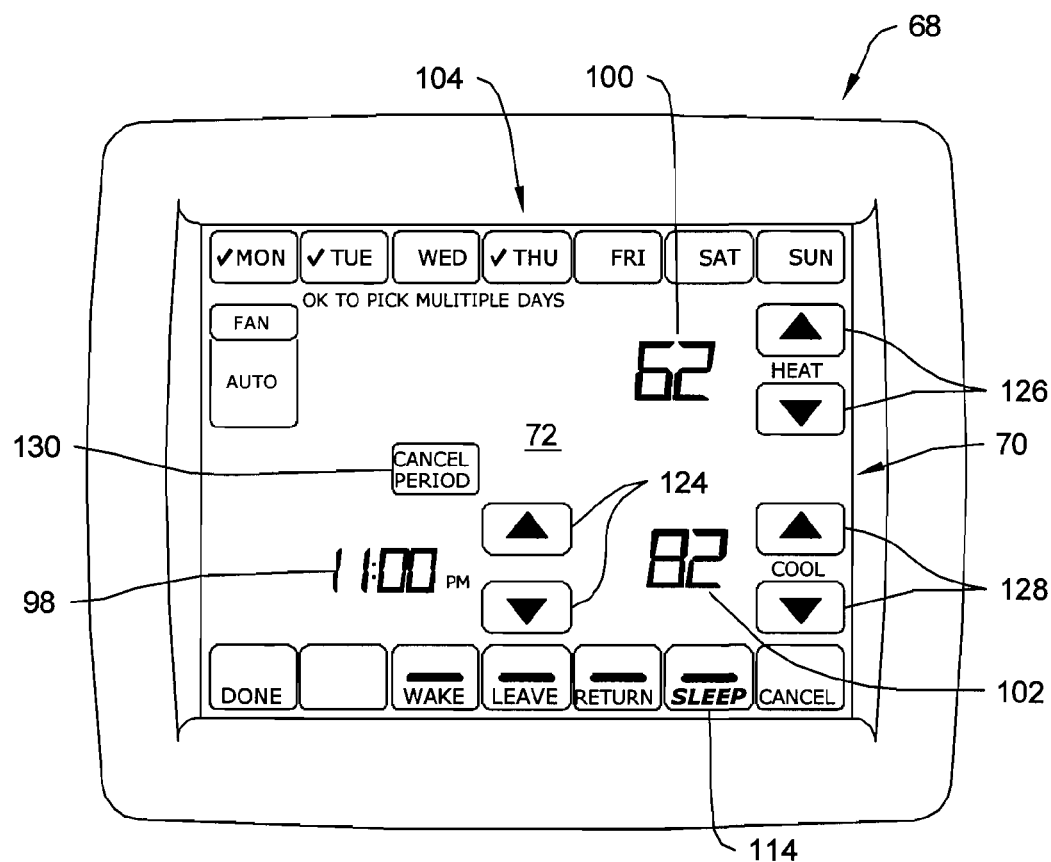

FIGS. 5G and 5H are pictorial views showing the schedule parameters corresponding, respectively, to the "return" and "sleep" periods of the schedule. In FIG. 5G, for example, the "RETURN" button 112 has been selected (indicated generally by bolded text), causing the controller 68 to display the event time parameter 98 (i.e. 6:00 PM), heat set point parameter 100 (i.e. 70° F.) and cool set point parameter 102 (i.e. 78° F.) on the touch screen 72. In similar fashion in FIG. 5H, the "SLEEP" button 114 has been selected, causing the controller 68 to display the event time parameter 98 (i.e. 11:00 PM), heat set point parameter 100 (i.e. 62° F.), and cool set point parameter 102 (i.e. 82° F.) for the "sleep" period on the touch screen 72. Once selected, the user may then adjust the schedule parameters using the appropriate set of up/down buttons 124, 126,128 on the touch screen 72, as desired.

In the illustrative embodiment, the user may select or deselect one or more days at any point during the editing mode using the appropriate day button(s) 104 located on the touch screen 72. In the illustrative view of FIG. 5H, for example, the user may desire to add "Wednesday" to the list of days to run the modified schedule parameters. To do so, the user may press the "WED" button 104 on the touch screen 72, causing the controller 68 to add that day to the modified schedule. Conversely, if the user desires to remove one or more days from the modified schedule, the user may simply press the appropriate day button 104 on the touch screen 72, causing the controller 68 to remove those day(s) from the modified schedule.

Figure 5I:
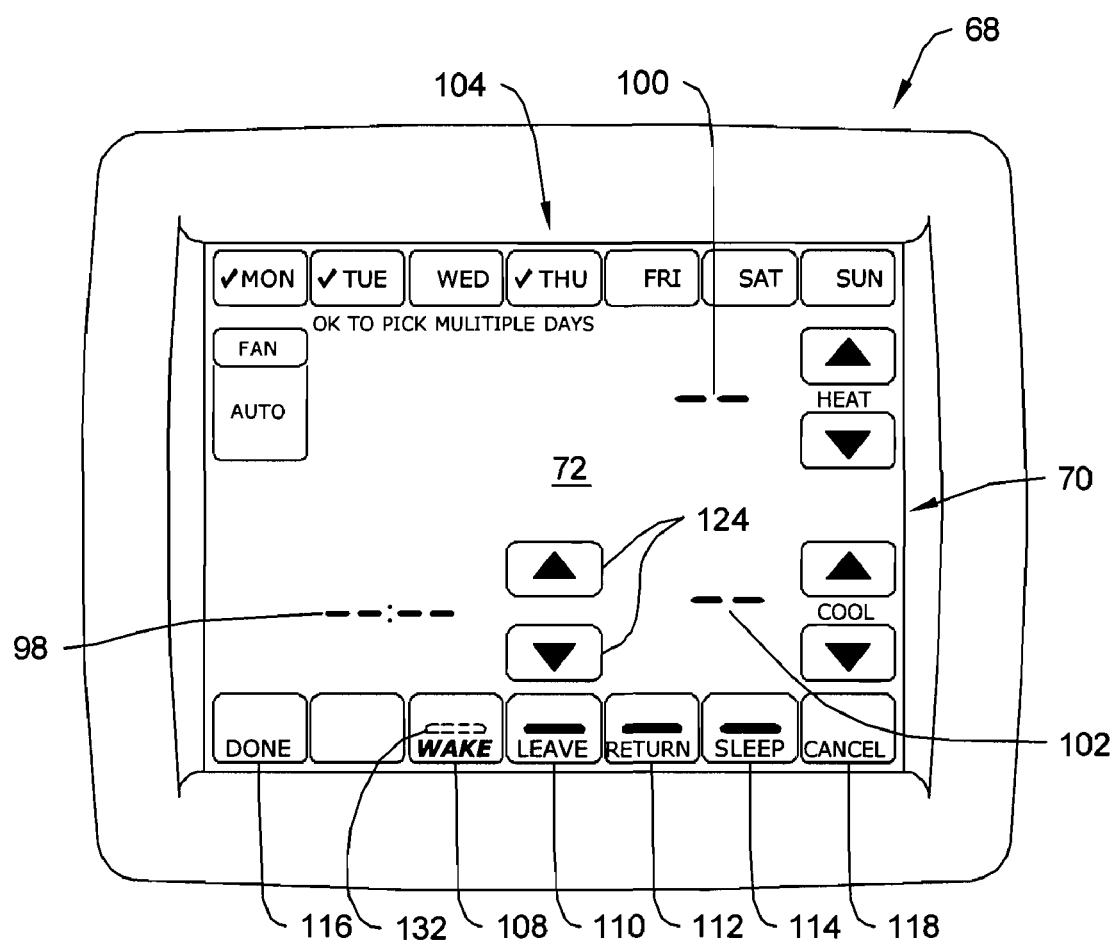

If the user desires to cancel a particular period from the schedule, the user can select the appropriate period button 108,110,112,114 and then press a "CANCEL PERIOD" button 130 on the touch screen 72. As shown in FIG. 5I, for example, when the user presses the "CANCEL PERIOD" button 130 while in the "wake" period, the controller 68 can be configured to cancel or zero-out the event time parameter 98, heat set point parameter 100, and/or cool set point parameter 102 for that period. An icon 132 normally situated above the "WAKE" button 108 can be configured to disappear on the touch screen 72, indicating to the user that the schedule parameters for that particular period have been cancelled. When the modified schedule is subsequently run, the controller 68 can be configured to apply the settings for the previous period towards the cancelled period until the next scheduled period occurs.

Figure 5J:
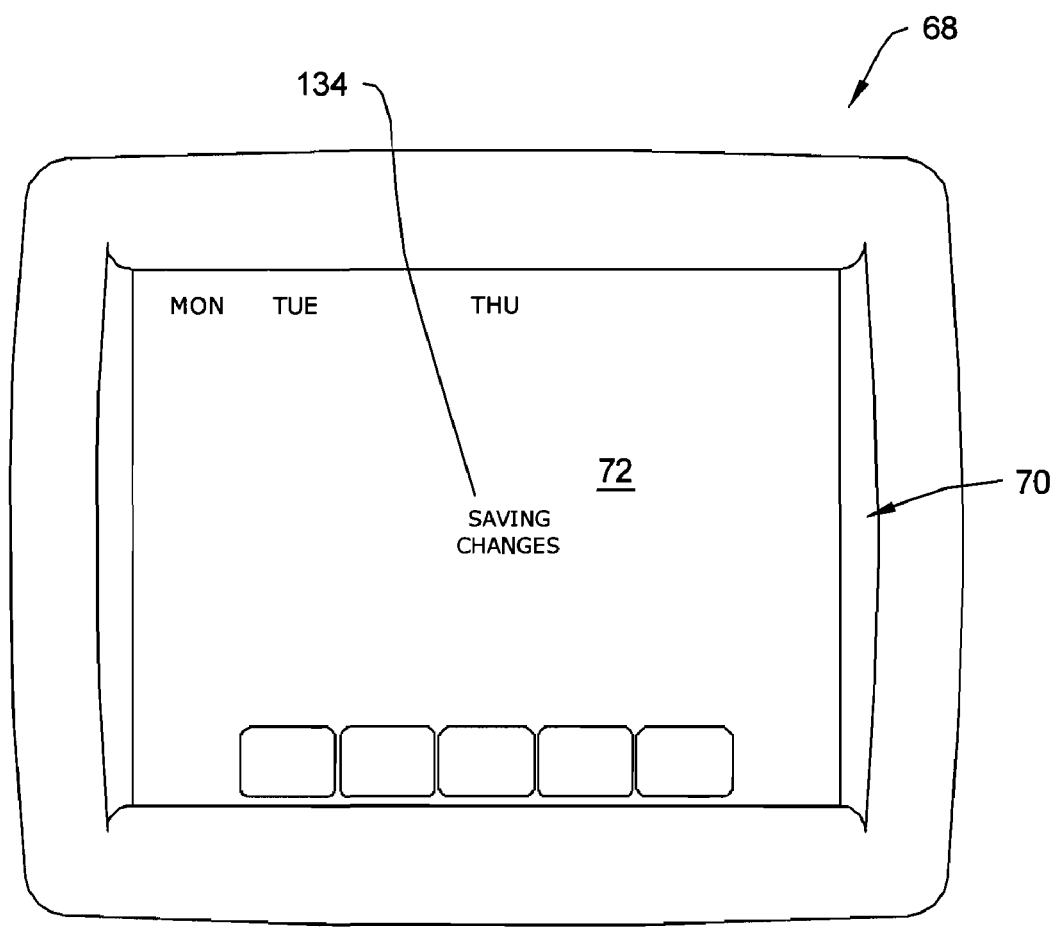

After the user has finished modifying the schedule, the user can press either the "DONE" button 116 to save the modified parameters in the schedule, or the "CANCEL" button 118 to discard the modified changes without saving. As shown in FIG. 5J, the controller 68 can be configured to temporarily display an alphanumeric message 134 such as "SAVING CHANGES" on the touch screen 72 at or near the time that the controller 68 saves the modified settings. The controller 68 can also be configured to temporarily display the days of the week on the touch screen 72 to confirm the selected days modified in the schedule. In some embodiments, the controller 68 can be configured to revert back to the main menu screen 76 of FIG. 5A and, if desired, automatically run the modified schedule.

Figure 6:
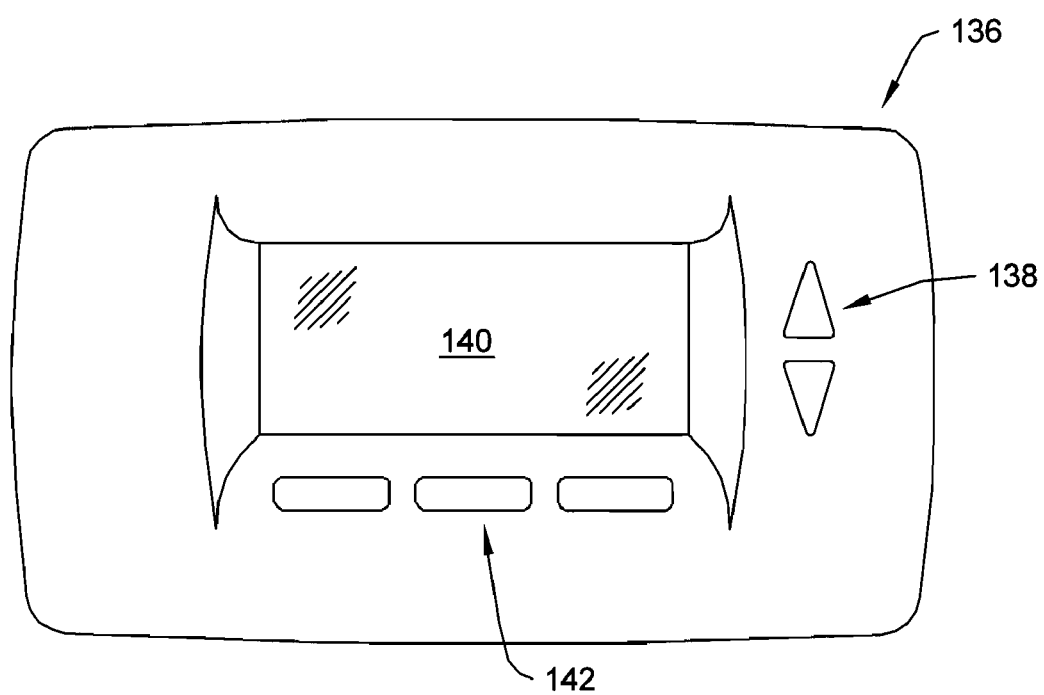
FIG. 6 is a plan view of another illustrative HVAC controller equipped with a display panel and keypad interface.

FIG. 6 is a plan view illustrating another exemplary HVAC controller 136 equipped with a user interface 138 suitable for programming a multiple-day schedule. In the illustrative embodiment of FIG. 6, the user interface 138 includes a display panel 140 and keypad 142 equipped with a number of buttons that can be pressed by the user to scroll through various menus or screens displayable on the display panel 140. Display panel 140 can include any number of suitable display devices, including, for example, a backlit LCD panel or LED screen.

FIGS. 7A-7J are pictorial views showing an illustrative method of programming a multiple-day schedule using the controller 136 and interface 138 of FIG. 6. In a first view depicted in FIG. 7A, the controller 136 can be configured to display a main menu screen 144 on the display panel 140, similar to that described above with respect to FIG. 5A. The controller 136, for example, can be configured to display a current inside temperature parameter 146 (in either ° F. or ° C.), a time of day parameter 148, and a day of week parameter 150. The controller 136 can also be configured to display the current set point parameter 152 on the display panel 140, indicating the temperature at which the controller 136 is currently set to maintain. A set of up/down buttons 154 on the keypad 142 can be used to scroll through the various schedule parameters displayed on the display panel 140. A second series of buttons 156,158,160 disposed below the display panel 140 can be utilized to navigate through one or more menus or screens displayable on the display panel 140.

Figure 7A:
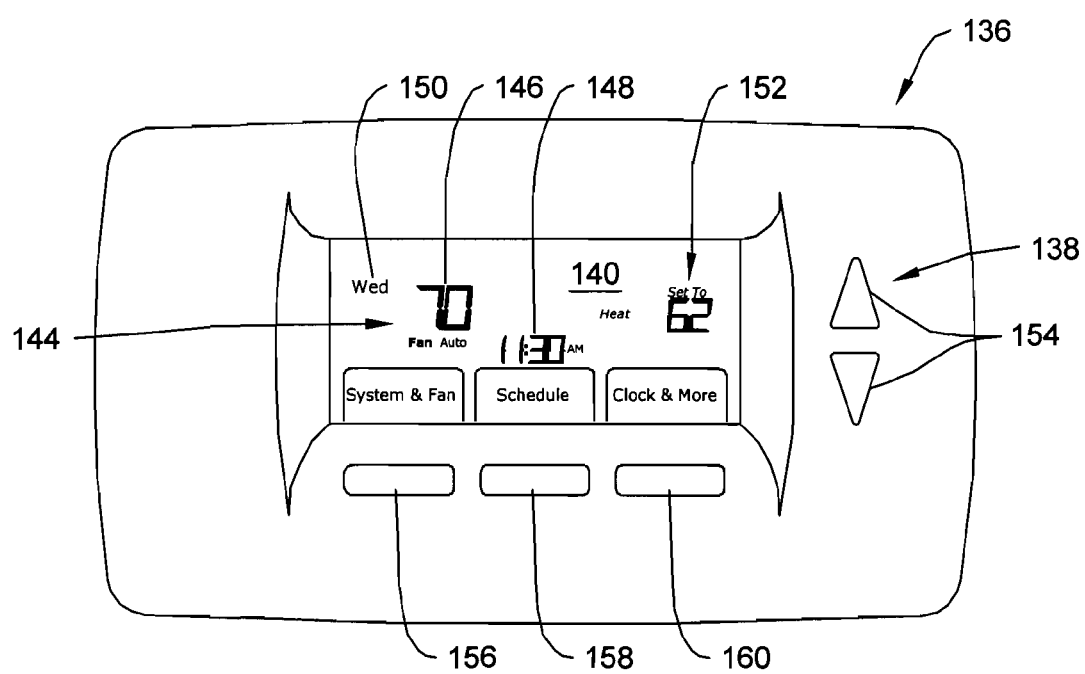
FIGS. 7A-7J are pictorial views showing an illustrative method of programming a multiple-day schedule using the display panel and keypad interface of FIG. 6.
Figure 7B:
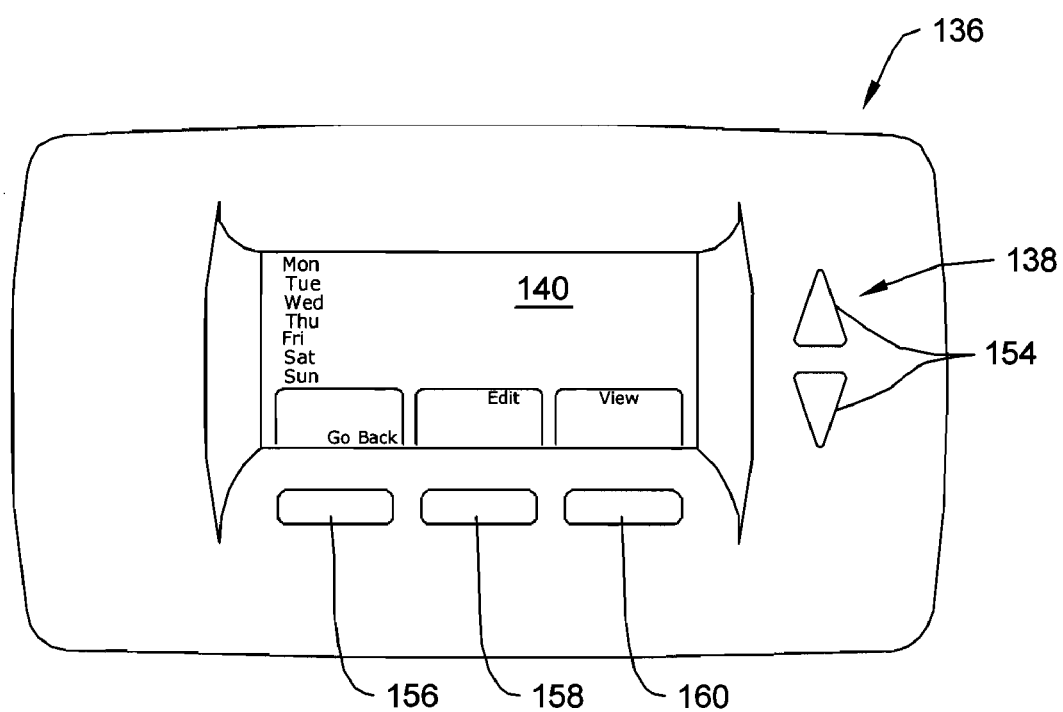

To initialize the scheduling routine within the controller 136, the user may press the button 158 located immediately below the text "SCHEDULE" located on the display panel 140. When pressed, the controller 136 can be configured to initiate a schedule review mode, causing the display panel 140 to display each day of the week, as shown in FIG. 7B. Using the up/down buttons 154, the user can scroll up or down between each day of the week. As each day is selected, the controller 136 can be configured to blink or otherwise indicate the day of the week that has been selected. The user can then press the button 156 located below the text "GO BACK" on the display panel 140 to go back to the previous screen (i.e. main screen 144), or buttons 158 or 160 to initiate, respectively, the editing and schedule review modes within the controller 136.

Figure 7C:
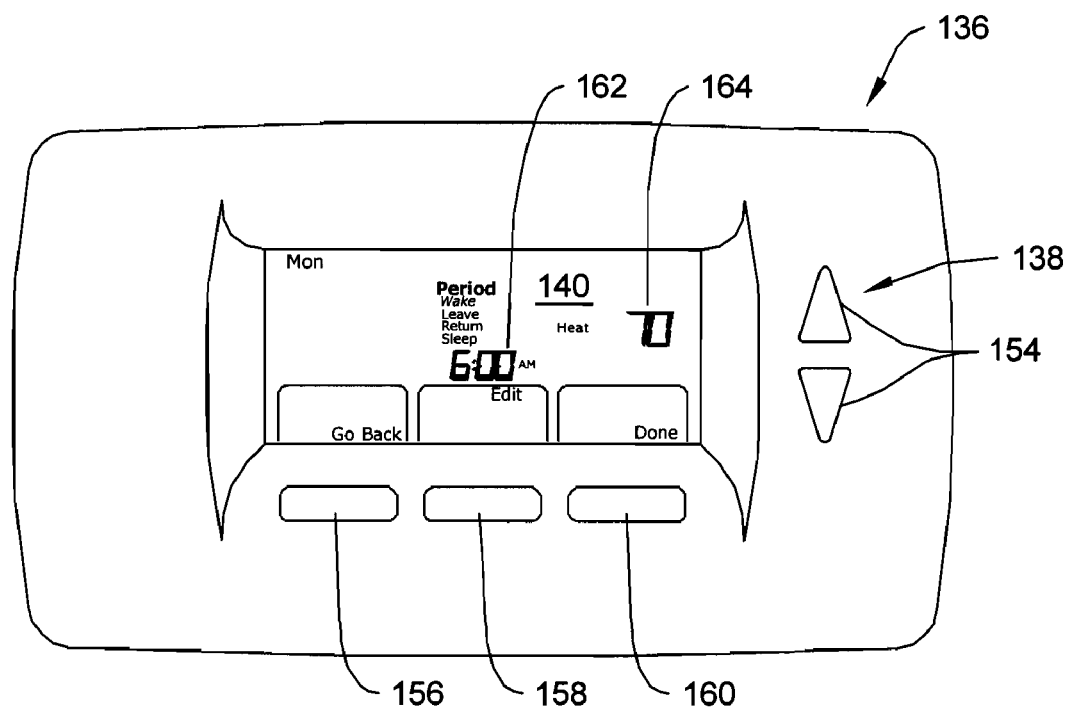

FIG. 7C is a pictorial view showing display panel 140 after "Monday" has been selected using the up/down buttons 154, and after button 160 has been pressed. As shown in FIG. 7C, for example, the controller 136 can be configured to display the event time parameter 162 and heat/cool set point parameter 164 for each individual period in the schedule. In FIG. 7C, for example, the various schedule parameters for each period can be displayed on the display panel 140 by repeatedly pressing the up/down buttons 154 on the keypad 142, causing the controller 136 to scroll through each individual period on the display panel 140. When the user is finished viewing the schedule parameters for that particular day, the user may either press button 156 to go back to the previous screen (see FIG. 7B), or button 160 to go back to the main screen 144 (see FIG. 7A).

To modify one or more parameters in the schedule, the user can initiate an editing mode within the controller 136. The user can modify the schedule either individually on a day-by-day basis from within the schedule review mode, or directly via the screen illustrated in FIG. 7B by bypassing the schedule review mode.

Figure 7D:
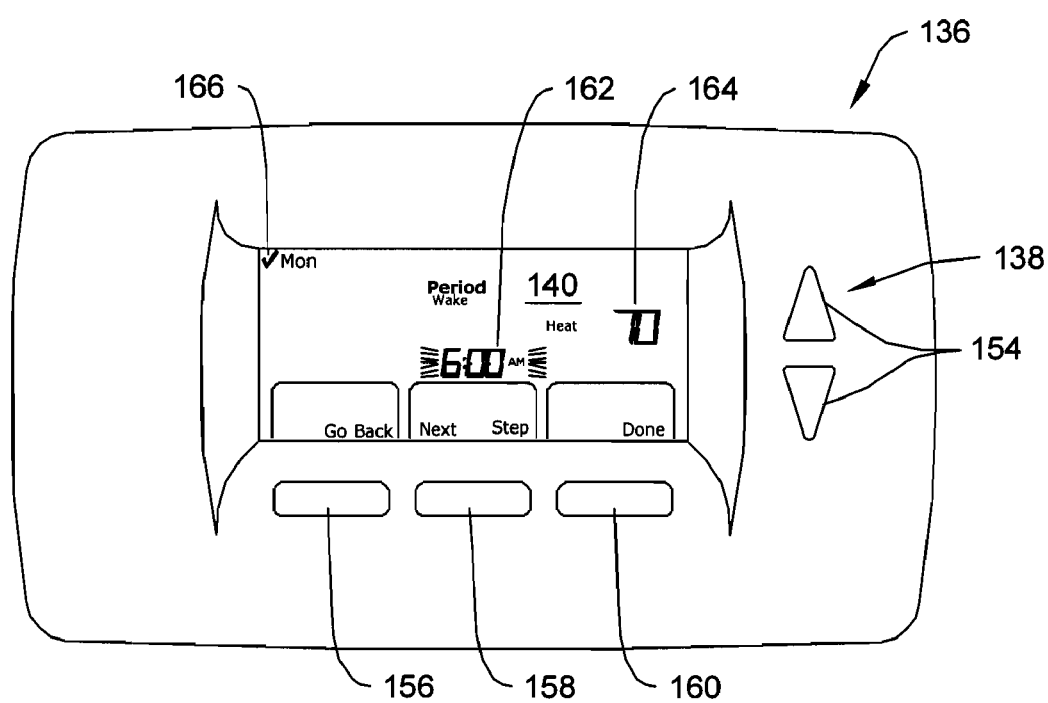

To edit the parameters on a day-by-day basis, the user, while within the schedule review mode, may select the individual day of the week to modify, and then press button 158 located below the text "Edit" located on the display panel 140 (see FIG. 7C). For the day "Monday" selected in FIG. 7C, for example, the user can press button 158 while viewing the various parameters for the "wake" period, causing the controller 136 to initiate the editing mode and display the parameters for that specific day, as shown in FIG. 7D. A check mark 166, blinking text, or other suitable indicator can be configured to appear on the display panel 140, indicating that the user has selected to modify the parameters for Monday.

The controller 136 can be configured to prompt the user to cycle through the various schedule parameters for each period by blinking the text for the selected schedule parameter on the display panel 140. For example, the event time parameter 162 in FIG. 7D can be configured to blink on and off, indicating that the user can modify that particular parameter using the up/down buttons 154 on the keypad 142. The user may then change the event time parameter 162 to, for example, 6:30 AM by repeatedly pressing the appropriate one of the up/down buttons 154 until 6:30 AM appears on the display panel 140.

Figure 7E:
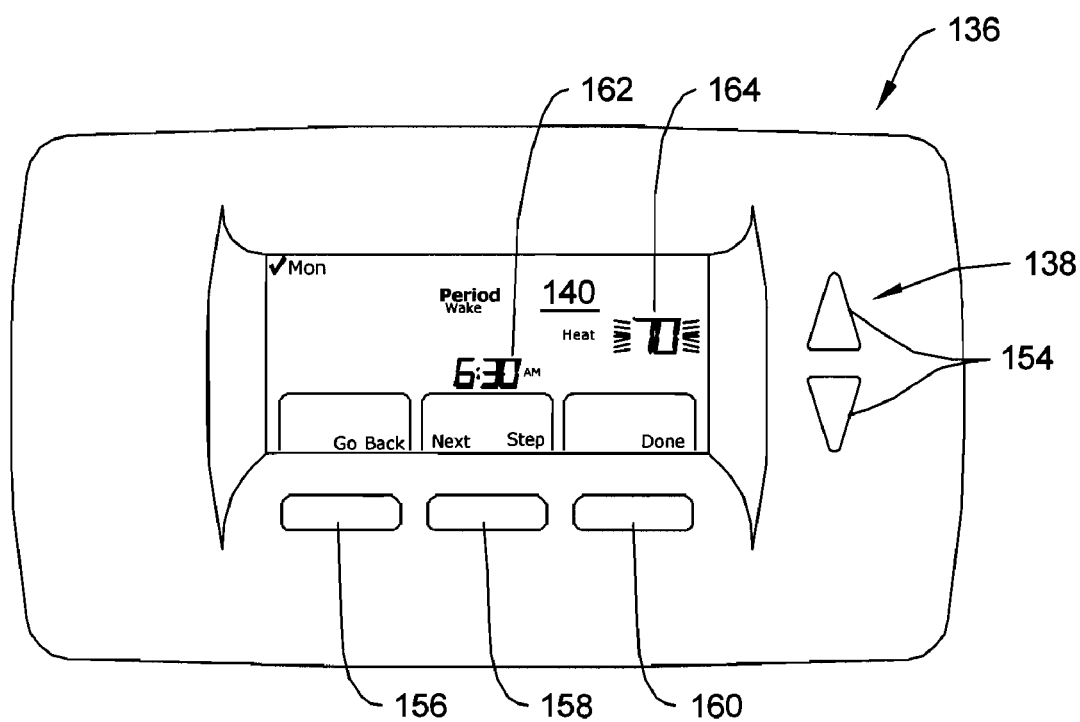
Figure 7F:
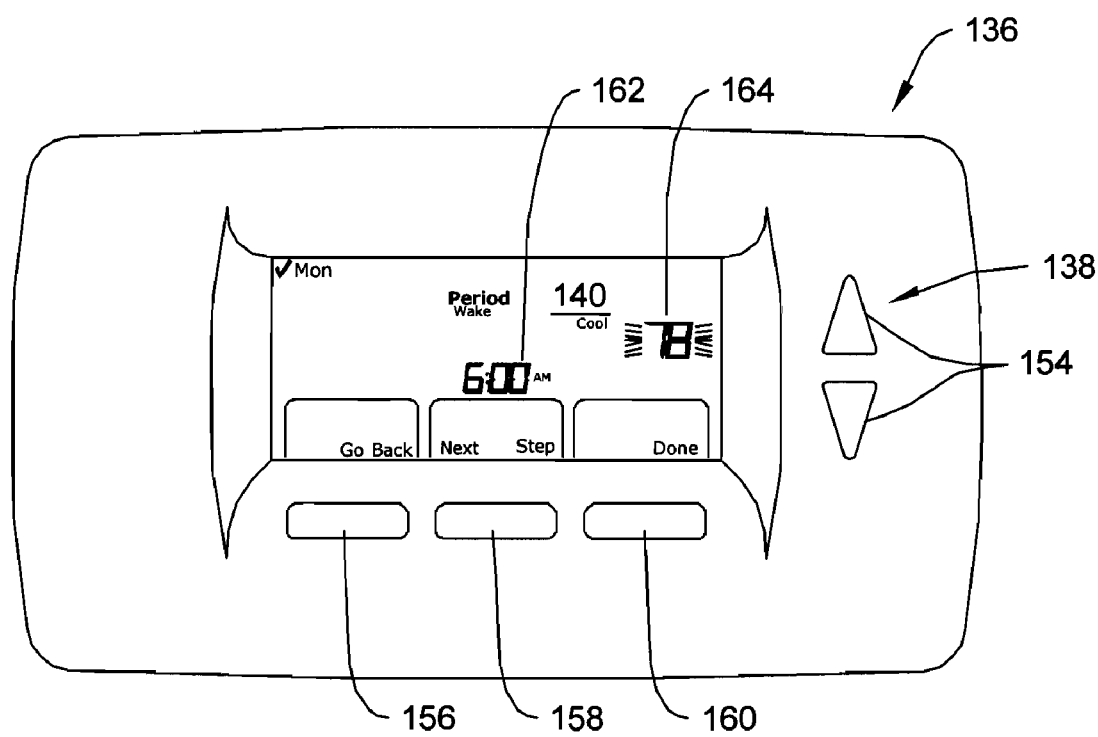
Figure 7G:
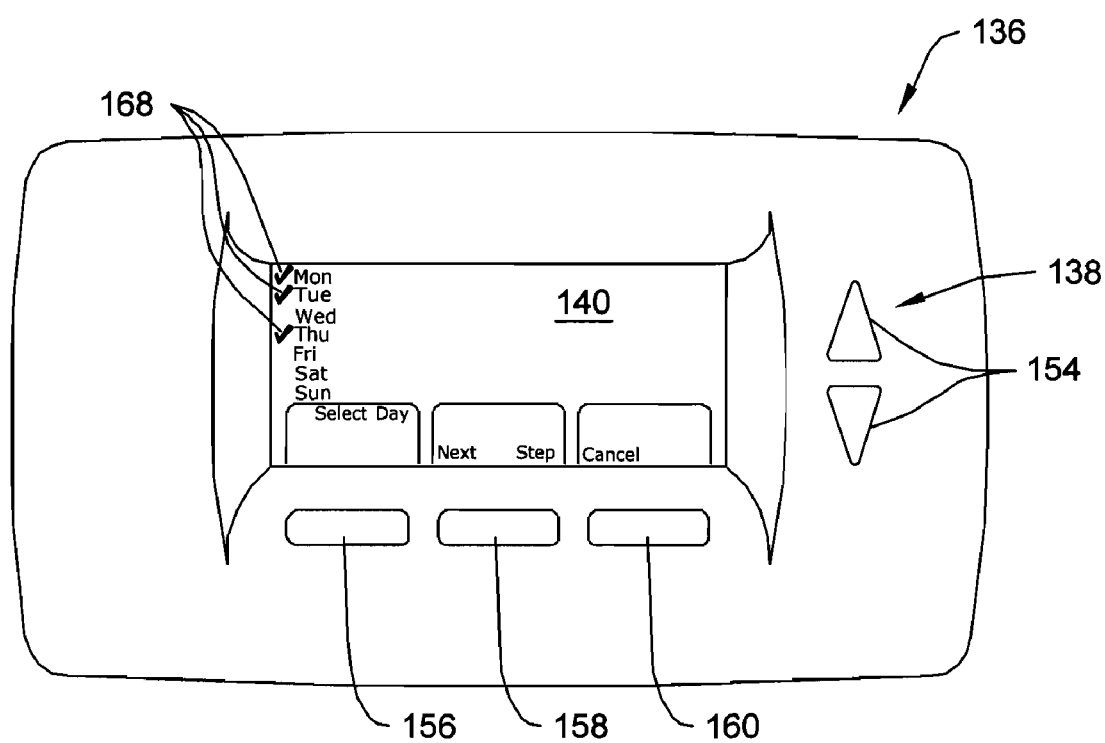

To change the other parameters for that selected period, the user can press button 158 located immediately below the text "Next Step" on the display panel 140, causing the controller 136 to cycle to the next schedule parameter in that period. As the user cycles through each schedule parameter, the controller 136 can be configured to blink the appropriate text on the display panel 140, as shown in FIGS. 7E-7F. When the user has cycled through each schedule parameter for the selected period, the user may press button 158 again, causing the controller 136 to cycle to the next period in the schedule. The process of selecting and modifying schedule parameters can then be repeated, as desired, until all of the parameters for each and every period have been selected. At any point during this process, the user can save the modified settings by pressing button 160 located under the text "Done" on the display panel 140, causing the controller 136 to save the modified schedule parameters.

To select multiple days to program at once in the illustrative embodiment, the user can initiate the editing mode directly from the screen depicted in FIG. 7B by pressing button 158 located under the text "Edit" on the display panel 140. When button 158 is pressed, the controller 136 can be configured to display the text "Select Day" above button 156, prompting the user to select one or more days to modify in the schedule. Using the up/down buttons 154 and the "select day" button 156, the user can scroll through each day of the week and, if desired, select individually each day of the week to modify in the schedule (e.g. Monday, Tuesday, and Thursday), as shown, for example, in FIG. 7G. A check mark 168, blinking text or suitable indicator can be displayed on the display panel 140 next to each day selected, indicating those days of the week to be modified in the schedule.

Figure 7H:
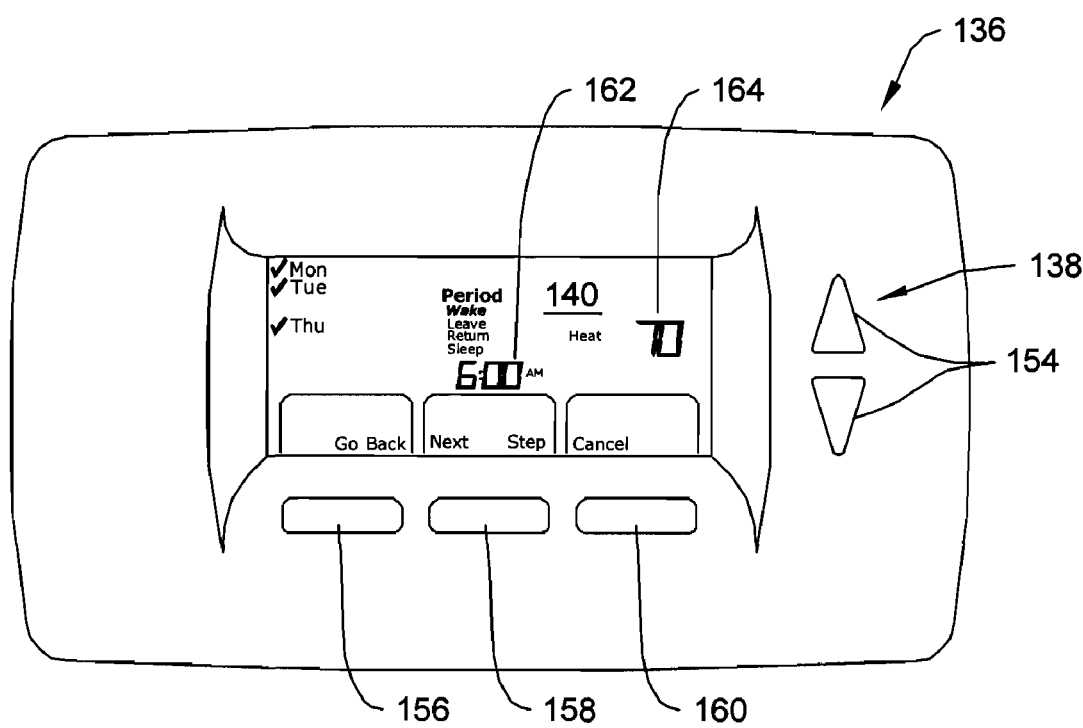
Figure 7I:
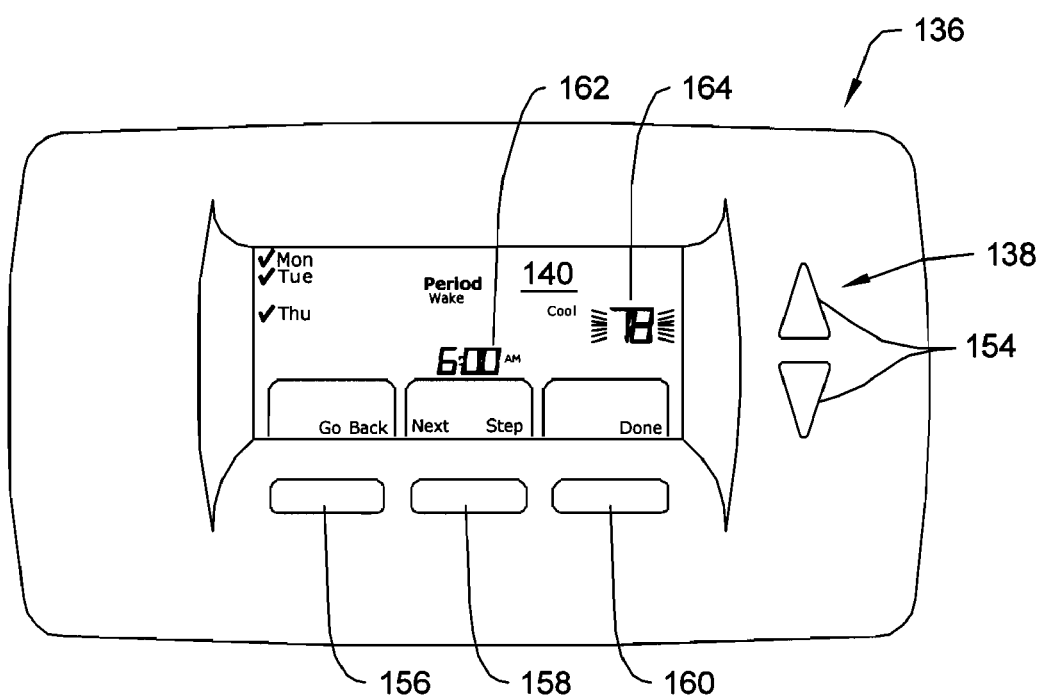

Once the user has selected the desired day or days to modify the schedule, the user can then press the "Next Step" button 158, causing the controller 136 to display the schedule parameters for one period. As shown in FIG. 7H, for example, the controller 136 can be configured to blink the text "Wake" on the display panel 140 (indicated generally by bolded text), indicating that the parameters for the "wake" period can be modified using the up/down buttons 154 and the "next/step" button 158, similar to that described above with respect to FIGS. 7D-7F. As shown in FIG. 7I, the user can press button 158 repeatedly until the display panel 140 indicates (by blinking text) that the cool set point parameter 164 has been selected. Using the up/down buttons 154, the user can then modify the cool set point parameter 164 to a higher or lower value, as desired.

When the user has cycled through each of the parameters for a particular period, the user may press button 158 again, causing the controller 136 to cycle to the next period in the schedule. The process of selecting and modifying the parameters can then be repeated, as desired, until all of the parameters for each period have been selected and modified (if desired). At any point during this process, the user can save the modified settings by pressing button 160 located under the text "Done" on the display panel 140, causing the controller 136 to save the modified schedule parameters.

Figure 7J:
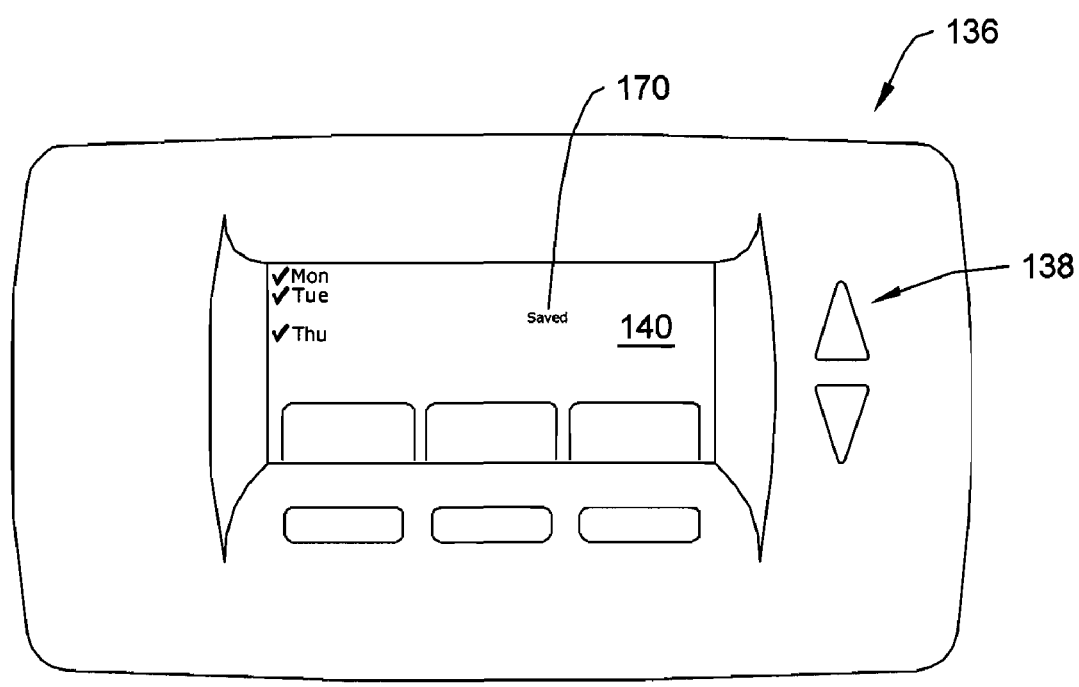

As shown in FIG. 7J, the controller 136 can be configured to temporarily display an alphanumeric message 170 such as "SAVED" on the display panel 140 at or near the time that the controller 136 saves the modified settings. The controller 136 can also be configured to temporarily display the days of the week on the display panel 140 to confirm to the user the particular days of the week modified in the schedule. In some embodiments, the controller 136 can revert back to the main menu screen 144 of FIG. 7A, and, if desired, automatically run the modified schedule.

FIG. 8 is a schematic view showing another illustrative embodiment for changing a selected set point value from a current value to a new value across a schedule. An illustrative weekly schedule for an HVAC controller is shown at 180, and an illustrative user interface is shown at 182. In the illustrative embodiment, the user is allowed to select a current set point value to change using a current set point selection box 184. The user is also allowed to select a new set point value using new set point selection box 186. In the illustrative embodiment, the HVAC controller may search though the set points in the schedule 180, and replace all of the set points in the schedule 180 that have the current value with the new set point value, regardless of the position within the schedule 180.

In some embodiments, the user interface 182 may also allow a user to select certain days (and/or period—e.g. Wake, Leave, Return, Sleep), as generally shown at 190. When so provided, the HVAC controller may search through the set points on the selected days (and/or periods) of the schedule 180, and replace those set points that have the current value with the new set point value.

In the example shown, and referring to user interface 182, the user has selected a current set point value of 70 degrees via current set point selection box 184, a new set point value of 72 degrees via new set point selection box 186, and days Tuesday, Wednesday, Thursday and Friday via days selection boxes generally shown at 190. In response, the HVAC controller may replace all set points on Tuesday, Wednesday, Thursday and Friday of the schedule 180 that have a value of 70 degrees with a new value of 72 degrees, regardless of the period (e.g. Wake, Leave, Return and Sleep periods). The set points to be updated to 72 degrees in this example are highlighted with a circle in the schedule 180. As noted above, and in some embodiments, the user interface 182 may allow a user to select one or more periods (e.g. Wake, Leave, Return and Sleep periods) rather than days, or in addition to days, as desired. In any event, the illustrative embodiment of FIG. 8 may reduce or eliminate the need to scroll through each day and/or period of the schedule, and make individual changes to the set points.

Figure 9:
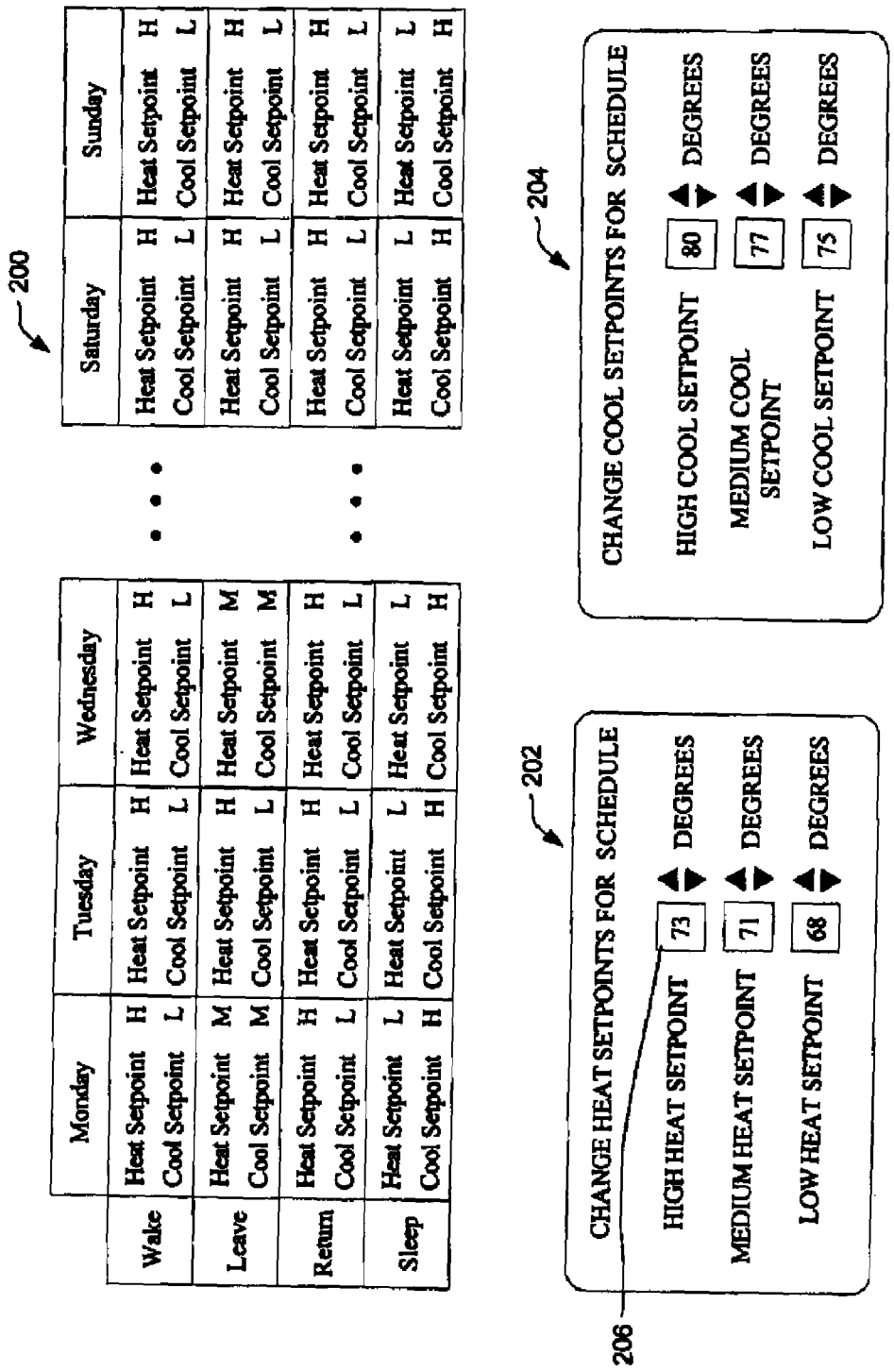
FIG. 9 is a schematic view showing another illustrative embodiment for changing set points across a schedule.

FIG. 9 is a schematic view showing another illustrative embodiment for changing set points across a schedule. FIG. 9 shows an illustrative weekly schedule 200 for an HVAC controller, an illustrative user interface 202 for setting heat set points, and an illustrative user interface 204 for setting cool set points. While the user interface 202 and 204 are shown as separate interfaces, it is contemplated they may be combined into one user interface, if desired.

In this illustrative embodiment, the set points in the schedule 200 are set to a tag or pointer value, rather than a temperature value. For example, the set points in the schedule 200 are set to tag or pointer value of High "H", Medium "M" or Low "L", corresponding to a high set point value, a medium set point value and a low set point value, respectively. A user interface, such as user interface 202, may then be used to assign and/or change a temperature value that is associated with each tag or pointer value. In the illustrative user interface 202 of FIG. 9, a value of 73 degrees has been assigned to the High "H" heat set point, a value of 71 degrees for the Medium "M" heat set point, and a value of 68 degrees for the Low "L" heat set point. In the illustrative embodiment, the user interface 204 may be used to assign cool set points in a similar manner. When operating in accordance with the schedule 200, the HVAC controller may read up the appropriate tag or pointer value, and set the current set point to the temperature assigned thereto.

By using a tag or point value, rather than a temperature value for the set points in the schedule 200, the user may more easily change a set point across the schedule. For example, in the illustrative embodiment, by changing the value assigned to the High "H" heat set point 206 from 73 degrees to 75 degrees, all of the heat set points with a tag or pointer value of high "H" may be changed across the schedule 200. This may help reduce or eliminate the need to scroll through each day and/or period of the schedule, and make individual changes to the set points.

Figure 10:
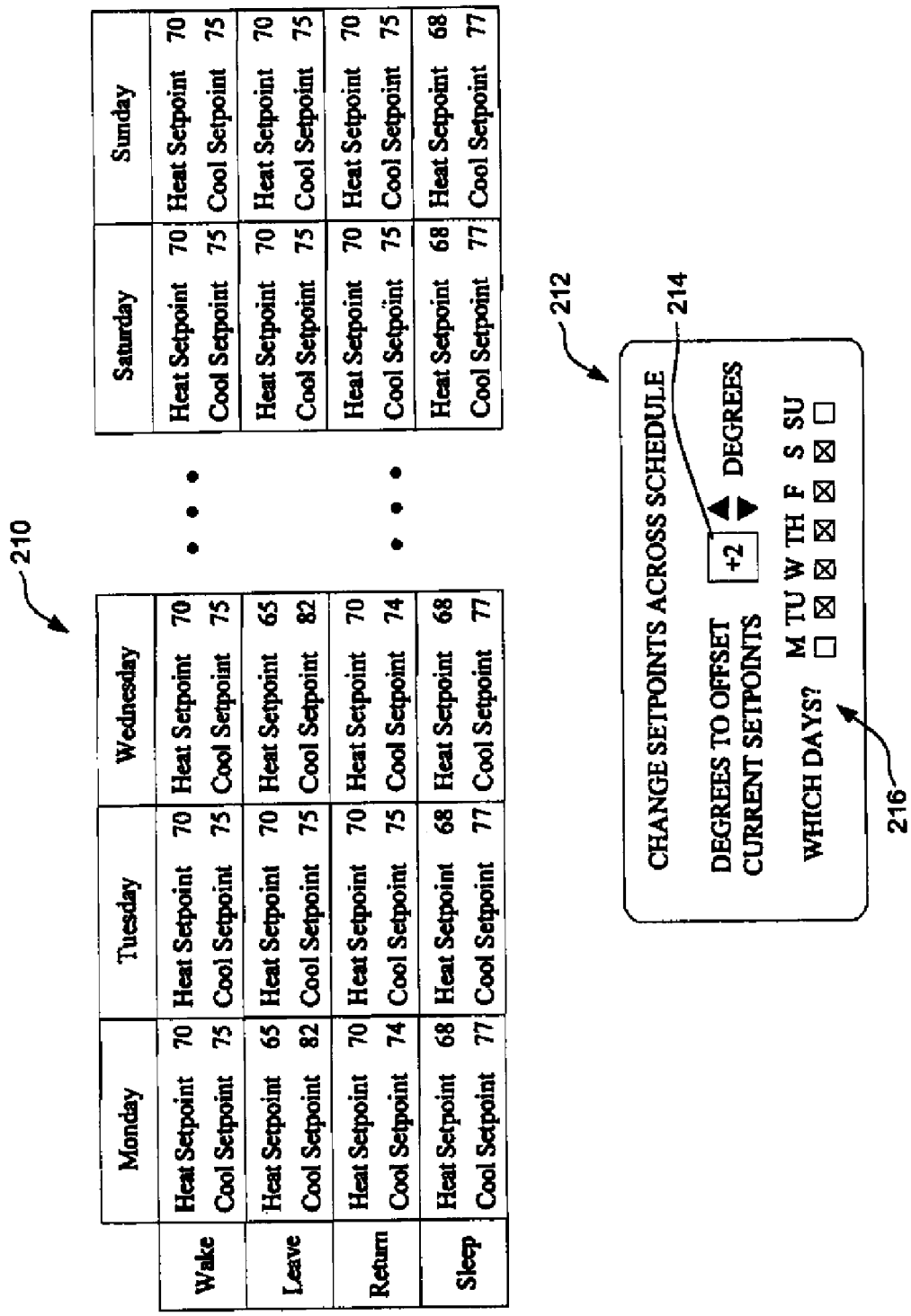
FIG. 10 is a schematic view showing yet another illustrative embodiment for changing set points across a schedule.

FIG. 10 is a schematic view showing yet another illustrative embodiment for changing set points across a schedule. FIG. 10 shows an illustrative weekly schedule 210 for an HVAC controller, and an illustrative user interface at 212. In this illustrative embodiment, the user interface 212 allows a user to input an offset value 214. The offset value 214 may be used to offset at least some of the set point values in the schedule 210. In some embodiments, all of the set point values in the schedule 210 are offset by the specified amount. In other embodiments, only those set points that are on selected days 216 and/or in selected periods (e.g. Wake, Leave, Return and Sleep), as desired. Also, and in some embodiments, the offset 214 may only be applied to "heat" set points, or only to "cool" set points, depending on the application. Again, this may help reduce or eliminate the need to scroll through each day and/or period of the schedule, and make individual changes to the set points.

Figure 11:
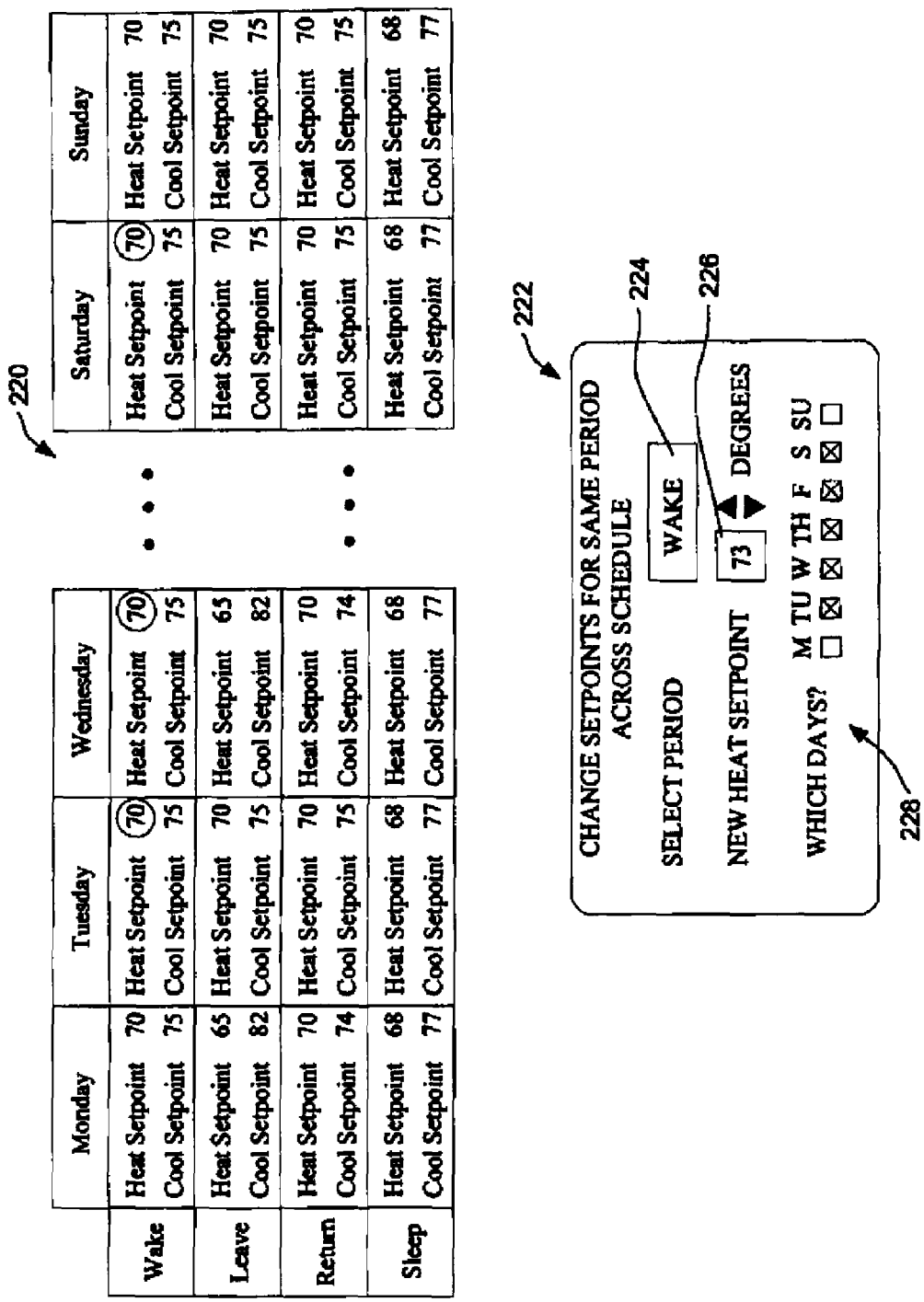
FIG. 11 is a schematic view showing an illustrative embodiment for changing set points of a selected period across a schedule.

FIG. 11 is a schematic view showing an illustrative embodiment for changing set points of a selected period across a schedule. FIG. 11 shows an illustrative weekly schedule 220 for an HVAC controller, and an illustrative user interface at 222. In this illustrative embodiment, the user interface 222 allows a user to select a desired period (e.g. Wake, Leave, Return and Sleep) 224 from the schedule 220, as well as a new set point value 226. In some embodiments, the user interface 222 may also allow the user to select one or more days of the schedule, as shown at 228. Once selected, the set points for the selected period, and possibly for the selected days, may be updated to the new set point value. In the example shown, the "Wake" period has been selected at 224, a new heat set point value of 73 degrees has been selected at 226, and days Tuesday through Saturday have been selected at 228. In this example, the heat set points for the "Wake" period on Tuesday through Saturday may be changed to 73 degrees. The set points that will be updated to 73 degrees in this example are highlighted by a circle in the schedule 220. As can be seen, this may also help reduce or eliminate the need to scroll through each day and/or period of the schedule, and make individual changes to the set points.

Figure 12:
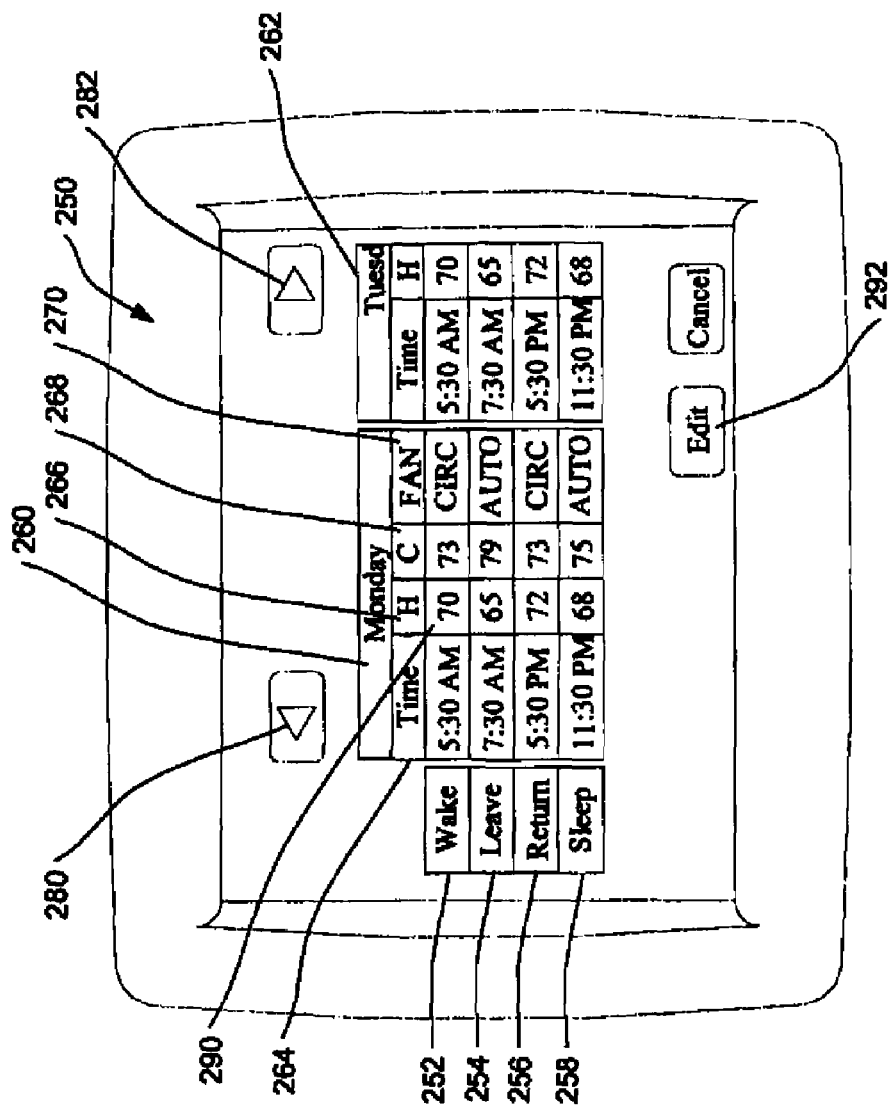
FIG. 12 is a schematic view showing an illustrative embodiment for displaying a number of device parameters of a schedule of a controller.

In some cases, it may be desirable to display some, many or all of the parameters of a schedule on a single or limited number of screens. This may help a user to get a more complete picture of the schedule without having to traverse many different display screens. FIG. 12 is a schematic view showing an illustrative embodiment for displaying a number of schedule parameters of a controller. The illustrative display 250 includes a number of schedule period rows including a "wake" period row 252, a "leave" period row 254, a "return" period row 256 and a "sleep" period row 258. It should be recognized that these are only illustrative schedule periods, and that any suitable schedule period may be used, as desired.

The illustrative display 250 also shows a number of day columns. Only a Monday column 260 and part of a Tuesday column 262 are shown on the illustrative display 250. However, in the illustrative embodiment, the schedule may also include day columns for the other days of the week. A number of schedule parameters are shown under each day column. For example, the Monday column 260 includes a "time" column 264 that shows the time that the corresponding schedule period begins, an "H" column 266 that shows the heat set point for the corresponding schedule period, a "C" column 268 that shows the cool set point for the corresponding schedule period, and a "FAN" column 270 that shows the fan mode for the corresponding schedule period. In the illustrative embodiment, the day columns for the other days of the week (not shown) may include the same or similar schedule parameter columns, if desired. It should be recognized that these schedule parameter columns are only illustrative, and that different programmed schedule parameters may be used as desired.

In one illustrative embodiment, the display 250 allows the user may scroll or pan across the controller schedule using scroll or pan buttons 280 and 282. For example, the user may press the right scroll or pan button 282 to move the display in a rightward direction relative to the controller schedule to display, for example, the rest of the Tuesday day column 262. When this occurs, some or all of the Monday day column 260 may fall off the left of the display and no longer be displayed. The user may again press the right scroll or pan button 282 to display all or part of the Wednesday day column (not shown). This may be repeated to view the entire schedule of the controller. At any time, the user may press the scroll or pan button 280 to scroll or pan back through the schedule in a leftward direction, as desired. The amount that the display travels relative to the controller schedule with each push of the scroll or pan buttons 280 and 282 may depend on the application, and in some cases, set by the user. For example, the display may travel a portion of a day column, an entire day column, or more than one day column with each push of the scroll or pan buttons 280 and 282.

In some embodiments, part of the display may remain stationary as the scroll or pan buttons 280 and 282 are pressed. For example, the "Wake", "Leave", "Return" and "Sleep" designators shown at 252, 254, 256 and 258 may remain stationary on the display 250. Likewise, the scroll or pan buttons 280 and 282 may remain stationary, as well as other control buttons, as desired.

In some embodiments, the user may select a particular parameter or set of parameters for modification. In the illustrative embodiment, the user may select, for example, the heat set point 290 for the wake period on Monday. The user may select the particular parameter in any number of ways. For example, if the display 250 is a touch screen, the user may simply touch the particular parameter. If the display 250 is not a touch screen, one or more navigation buttons (not shown) may be used to traverse and select various parameters of the schedule. Once selected, the user may edit the parameter, if desired. For example, and in the illustrative embodiment, the user may press the edit button 292 to enter an edit mode. Then, one or more up/down buttons (not shown) or the like may be used to change the value of the selected schedule parameter.

The schedule may appear to be one continuous schedule extending from Monday through Sunday, with the display 250 appearing as a "window" that displays only a portion of the schedule. The scroll or pan buttons 280 and 282 may be used to move the display "window" across the schedule. It is believed that this may provide an intuitive interface that may help a user can get a more complete picture of the schedule without having to traverse many different display screens.

Figure 13:
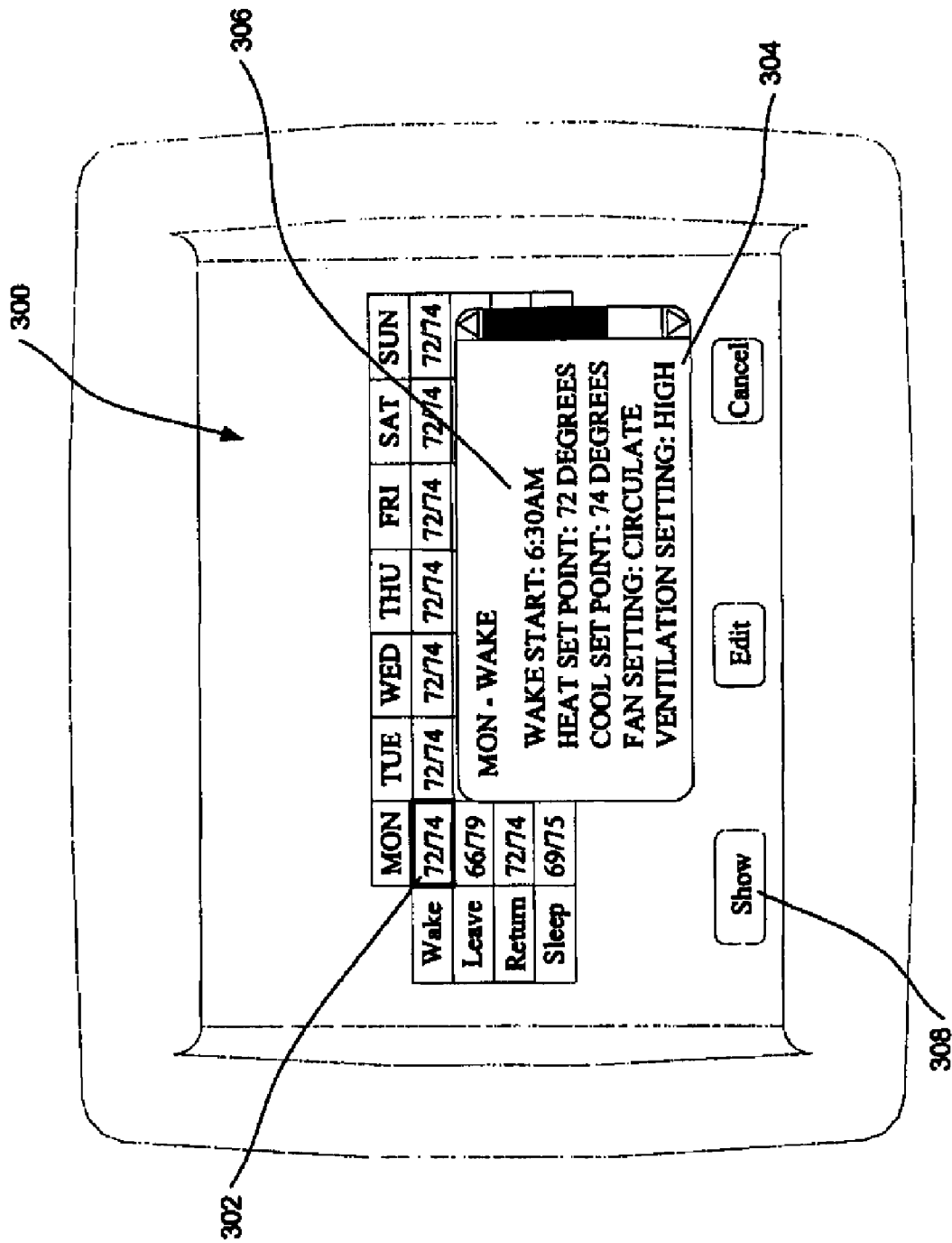
FIG. 13 is a schematic view showing another illustrative embodiment for displaying a number of device parameters of a schedule of a controller.

FIG. 13 is a schematic view showing another illustrative embodiment for displaying a number of device parameters of a schedule of a controller. In this illustrative embodiment, the display 300 shows a subset of the schedule parameters, but not all of the schedule parameters. Referring to FIG. 13, and in the illustrative embodiment, only the heat and cool set points are shown for each schedule period (e.g. wake, leave, return, sleep) and for each day. In some cases, this amount of information may fit onto a single screen of a controller. While the heat and cool set points may provide the user with a good overall picture of the currently programmed schedule, it is contemplated that any subset of the schedule parameters may be chosen for display. Also, and in some embodiments, the user may select which subset of the schedule parameters are selected for display.

To view additional schedule parameters, and in the illustrative embodiment, the user may select a particular schedule period and day. For example, and in FIG. 13, the user has selected the "Wake" period for Monday, as highlighted by dark box 302. When selected, the illustrative display may provide a pop-up window 304 that displays some or all of the schedule parameters for that period/day. In some embodiments, a show button 308 or the like may be provided to cause the display to provide the pop-up window 304, although this is not required or even desired in all embodiments.

In some embodiments, the user may select a particular schedule parameter in the pop-up window 304 for editing. For example, the user may select the Wake Start Time 306 for editing. Once selected, the user may change the value of the Wake Start Time, as desired. Again, it is believed that this may provide an intuitive interface that may help a user get a more complete picture of the schedule without having to traverse many different display screens.

Figure 14:
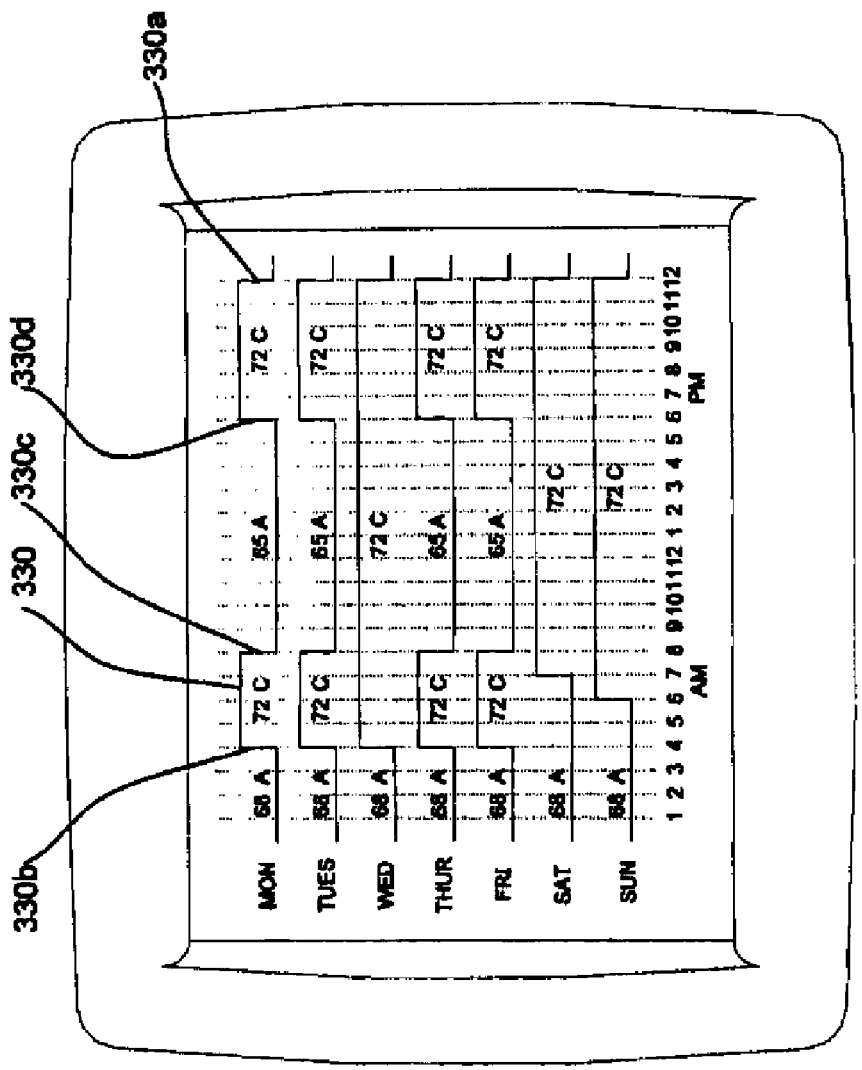
FIG. 14 is a schematic view showing yet another illustrative embodiment for displaying a number of device parameters of a schedule of a controller.

FIG. 14 is a schematic view showing yet another illustrative embodiment for displaying a number of device parameters of a schedule of a controller. In this illustrative embodiment, a controller schedule is shown in a graphical format. The time of day extends from left to right, beginning at 1 AM and ending to 12 AM. In the illustrative embodiment, vertically extending dashed lines are provided to show the beginning of each hour of the day.

Each of the seven days of a week is shown along the left of the graph. While seven days are shown, it is contemplated that fewer or more days may be provided, or groups of days, or other time periods, may be provided depending on use. Each of the seven days includes a line graph that indicates when each of a number of schedule time periods begins. In the illustrative embodiment, "wake", "leave", "return" and "sleep" time periods are available for each day. However, it should be recognized that other schedule time periods may be used, if desired.

Referring the line graph 330 for Monday, the "sleep" time period begins at 12:00 AM as indicated at 330a, the "wake" time period begins at 4:00 AM as indicated at 330b, the "leave" time period begins at 8:00 AM as indicated at 330c and the "return" time period begins at 6:00 PM as indicated at 330d. In the illustrative embodiment, the height of the line graph only indicates a relative temperature (e.g. comfort temperature versus energy saving temperature), and does not indicate an actual temperature set point. Instead, the heat set point, fan setting, and other parameters may be shown adjacent to the line graph in each or selected schedule periods. For example, and in the illustrative embodiment, designations "68" "A" are provided adjacent to the line graph during the "sleep" period. The designation "68" indicates that the heat set point is set to 68 degrees, and the designation "A" indicates that the fan mode is set to AUTO. Similar designations may be provided for the "wake", "leave" and "return" schedule time periods, as shown. Although not explicitly shown, cool set points and/or other schedule parameters may be provided on the display. Also, in some embodiments, the height of the line graph may provide a measure of, for example, a set point temperature. That is, the horizontal lines of the line graph 330 may be positioned along a vertical temperature scale provided for line graph 330 so that the vertical position of each horizontal segment provides an indication of the heat set point or some other schedule parameter of the schedule. Alternatively, or in addition, the color of graph segments may provide an indication of the value of the schedule parameter (e.g. set point temperature). It is believed that this embodiment may also provide an intuitive interface that may help a user get a more complete picture of the schedule without having to traverse many different display screens.

Figure 15:
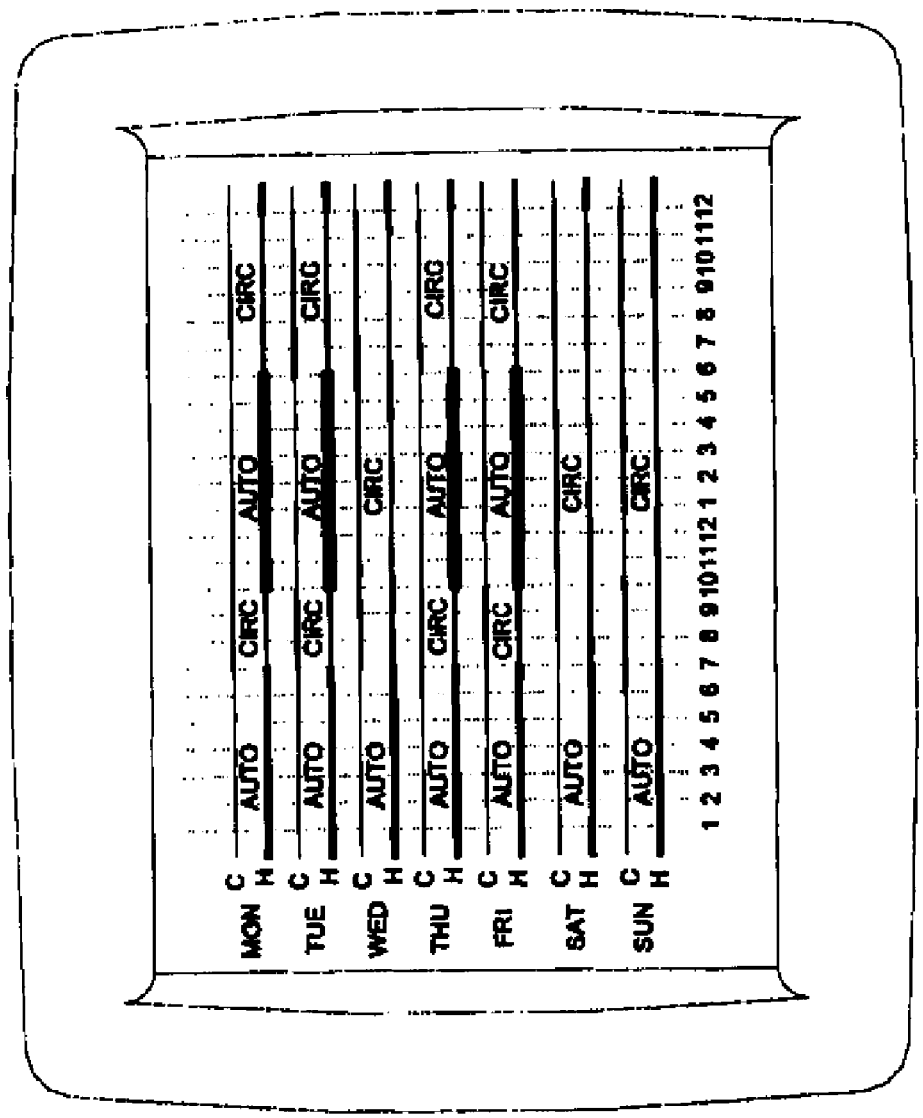
FIG. 15 is a schematic view showing another illustrative embodiment for displaying a number of device parameters of a schedule of a controller.

FIG. 15 is a schematic view showing another illustrative embodiment for displaying a number of device parameters of a schedule of a controller. Like above, and in this illustrative embodiment, a controller schedule is shown in a graphical format. The time of day extends from left to right, beginning at 1 AM and ending to 12 AM. In the illustrative embodiment, vertically extending dashed lines are provided to show the beginning of each hour of the day.

Each of the seven days of a week is shown along the left of the graph. While seven days are shown, it is contemplated that fewer or more days may be provided, or groups of days, or other time periods, may be provided depending on use. In the illustrative embodiment, each of the seven days includes two linear line graphs, each having a number of segments. The upper linear line graph corresponds to the programmed cool set point, and the lower linear line graph corresponds to the programmed heat set point. A fan setting indicator is shown between the two linear line graphs. While two linear graphs for each day are shown in FIG. 15, it is contemplated that more or less line graphs may be provided, as desired.

In the illustrative embodiment, each linear line graph includes a number of line segments. Each line segment corresponds to a schedule time period. For example, a first segment may correspond to a "sleep" time period. A second, a third and a fourth segment may correspond to a "wake", a "leave", and a "return" time period, respectively. As noted above, it should be recognized that other schedule time periods may be used, if desired. If the start time of a particular schedule time period is changed, the length and position of the corresponding line segment(s) may also change to correspond to the changed start time.

As shown in FIG. 15, each line segment may be displayed in a manner that provides an indication of the value of a corresponding schedule parameter. In FIG. 15, the darker the line, the cooler the set point temperature. Alternatively, or in addition, color or any other suitable visually discernable indicator may be used, as desired, to provide an indication of the value of a corresponding schedule parameter. In some embodiments, a scale (not shown) may be provided that associates a segment display characteristic to a schedule parameter value. For example, a color scale may be provided that associates a particular color to a set point particular temperature. By using the color scale, the user may be able to determine the value of the schedule parameter from simply viewing the display characteristics of the line segments shown in FIG. 15. It is believed that this embodiment may also provide an intuitive interface that may help a user get a more complete picture of the schedule without having to traverse many different display screens.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A method for programming a programmable thermostat that is configured to control one or more pieces of HVAC equipment in accordance with a schedule, the schedule having a number of days and one or more time periods for each of at least some of the days, and wherein one or more control parameters are associated with each of the time periods, the method comprising:

(a) selecting a first time period of the schedule via a user interface;

(b) displaying control parameters for the selected first time period but not displaying control parameters for non-selected time periods;

(c) individually sequentially selecting each of two or more days using the user interface without first requiring the user to assign the selected days to a group;

(d) entering a control parameter value for the first selected time period via the user interface;

(e) selecting a next time period of the schedule via the user interface;

(f) displaying control parameters for the selected next time period but not displaying control parameters for non-selected time periods;

(g) entering a control parameter value for the selected next time period via the user interface;
(h) repeating steps (e) through (g) for additional desired time periods; and
(i) using the entered control parameter value for each selected time period on the two or more selected days of the schedule when subsequently operating the programmable thermostat.

2. The method of claim 1 wherein the user interface is part of the programmable thermostat.

3. The method of claim 1 wherein the user interface is part of a device remote from the programmable thermostat.

4. The method of claim 3 wherein the device is a mobile computing device.

5. The method of claim 4 wherein the mobile computing device includes a personal digital assistant (PDA).

6. The method of claim 1, wherein the user interface includes a touchscreen.

7. A mobile computing device for use in remotely programming a programmable schedule of a thermal comfort controller, wherein the programmable schedule includes two or more days, two or more periods for each of the two or more days and a set-point for each of the two or more periods, wherein each set-point includes a set-point time and a set-point temperature, the mobile computing device comprising:
a user interface including a display;
a controller coupled to user interface, the controller configured to display on the display:
a day select region for individually selecting each of two or more days of the programmable schedule;
a period select region for selecting a first period of the two or more periods of the programmable schedule or a second period of the two or more periods of the programmable schedule, wherein the controller deselects the first period when the second period is selected, and deselects the second period when the first period is selected;
a set-point time display region for displaying the set-point time of the set-point that corresponds to the selected two or more days and the selected first or second period;
a set-point temperature display region for displaying the set-point temperature of the set-point that corresponds to the selected two or more days and the selected first or second period; and
the controller is configured to simultaneously display the set-point time and the set-point temperature in the set-point time display region and the set-point temperature display region.

8. The mobile computing device of claim 7, wherein the day select region, the set-point time and the set-point temperature are simultaneously displayed on the display of the mobile computing device.

9. The mobile computing device of claim 7, wherein the user interface includes a touch screen display, and the controller is configured to accept a first input via the touch screen display to adjust the set-point time of the set-point that corresponds to the selected two or more days and the selected first or second period, wherein the controller displays the adjusted set-point time in the set-point time display region.

10. The mobile computing device of claim 9, wherein the controller is configured to display an up button and a down button on the touch screen display, and the first input includes one or more touches of the up button and/or the down button.

11. The mobile computing device of claim 10, wherein the controller is configured to accept a second input via the touch screen display to adjust the set-point temperature of the set-point that corresponds to the selected two or more days and the selected first or second period, wherein the controller displays the adjusted set-point temperature in the set-point temperature display region.

12. The mobile computing device of claim 9, wherein the controller is configured to accept a second input via the touch screen display to adjust the set-point temperature of the set-point that corresponds to the selected two or more days and the selected first or second period, wherein the controller displays the adjusted set-point temperature in the set-point temperature display region.

13. The mobile computing device of claim 12, wherein the controller is configured to display an up button and a down button on the touch screen display, and the second input includes one or more touches of the up button and/or the down button.

14. The mobile computing device of claim 7, wherein the programmable schedule includes four periods for each of the two or more days, and wherein the period select region can be used to select either the first period, the second period, a third period or a fourth period of the four periods, wherein when one of the four periods is selected, the controller deselects all unselected periods and displays the set-point time in the set-point time display region and the set-point temperature in the set-point temperature display region for the set-point that corresponds to the selected period of the selected two or more days.

15. A mobile computing device for use in remotely programming a programmable schedule of a thermal comfort controller, wherein the programmable schedule includes two or more days, two or more periods for each of the two or more days and a set-point for each of the two or more periods, wherein each set-point includes a set-point time and a set-point temperature, the mobile computing device comprising:
a user interface including a display;
a controller coupled to user interface, the controller configured to display on the display:
a day select region for individually selecting each of two or more days of the programmable schedule;
a period select region for selecting one of two or more periods of the programmable schedule;
a set-point time display region for displaying the set-point time of the set-point that corresponds to the selected two or more days and the selected one of the two or more periods, while not displaying the set-point time of the set-points of unselected days and unselected periods; and
a set-point temperature display region for displaying the set-point temperature of the set-point that corresponds to the selected two or more days and the selected one of the two or more periods, while not displaying the set-point temperature of the set-points of unselected days and unselected periods.

16. A method according to claim 15, wherein the controller deselects all periods other than the selected period.

17. A method for programming a programmable schedule of a thermal comfort controller, wherein the programmable schedule includes two or more days, two or more periods for each of the two or more days and a set-point for each of the two or more periods, wherein each set-point includes a set-point time and a set-point temperature, the method comprising:
accepting input from a user at a device that is remote from the thermal comfort controller, the input including:
a day selection input for individually selecting each of two or more days of the programmable schedule;

a period selection input for selecting one of two or more periods of the programmable schedule;

a set-point time input for entering a set-point time for the set-point that corresponds to the selected two or more days and the selected one of the two or more periods;

a set-point temperature input for entering a set-point temperature for the set-point that corresponds to the selected two or more days and the selected one of the two or more periods;

wherein the set-point temperature input is received without the use of a pop-up menu; and communicating changes of the set-point that corresponds to the selected two or more days and the selected one of the two or more periods to the thermal comfort controller.

18. The method of claim 17, wherein the set-point time input is entered without the use of a pop-up menu.

19. The method of claim 17, wherein the day selection input is entered without the use of a pop-up menu.

20. The method of claim 17, wherein the period selection input is entered without the use of a pop-up menu.

21. The method of claim 17, wherein the set-point time input, the day selection input and the period selection input are all entered without the use of a pop-up menu.

* * * * *